United States Patent
Uehara et al.

(10) Patent No.: US 11,168,226 B2
(45) Date of Patent: Nov. 9, 2021

(54) COMPOSITION

(71) Applicant: SUMITOMO CHEMICAL COMPANY, LIMITED, Tokyo (JP)

(72) Inventors: Michiru Uehara, Osaka (JP); Tomohiro Ito, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 70 days.

(21) Appl. No.: 16/493,190

(22) PCT Filed: Mar. 23, 2018

(86) PCT No.: PCT/JP2018/011697
§ 371 (c)(1),
(2) Date: Sep. 11, 2019

(87) PCT Pub. No.: WO2018/180983
PCT Pub. Date: Oct. 4, 2018

(65) Prior Publication Data
US 2020/0017639 A1    Jan. 16, 2020

(30) Foreign Application Priority Data
Mar. 31, 2017 (JP) .............. JP2017-070990

(51) Int. Cl.
| | | |
|---|---|---|
| C09D 7/63 | (2018.01) | |
| C08G 77/16 | (2006.01) | |
| C08G 77/08 | (2006.01) | |
| C08K 5/092 | (2006.01) | |
| C08K 5/5415 | (2006.01) | |
| C09D 183/04 | (2006.01) | |
| C08G 77/18 | (2006.01) | |
| B05D 5/00 | (2006.01) | |
| C09K 3/18 | (2006.01) | |

(52) U.S. Cl.
CPC .............. *C09D 7/63* (2018.01); *C08G 77/08* (2013.01); *C08G 77/18* (2013.01); *C08K 5/092* (2013.01); *C08K 5/5415* (2013.01); *C09D 183/04* (2013.01); *B05D 5/00* (2013.01); *C09K 3/18* (2013.01)

(58) Field of Classification Search
USPC .................. 106/287.13, 287.14, 287.16
See application file for complete search history.

(56) References Cited

U.S. PATENT DOCUMENTS

| | | | |
|---|---|---|---|
| 5,800,926 A | 9/1998 | Nogami et al. | |
| 6,472,012 B2* | 10/2002 | Nakada | C03C 17/30 427/58 |
| 6,572,973 B1* | 6/2003 | Taruishi | C09D 183/14 428/447 |
| 2001/0024728 A1* | 9/2001 | Kamitani | C09D 183/00 428/446 |
| 2007/0155896 A1* | 7/2007 | Motoyama | C09D 183/08 524/837 |
| 2017/0313728 A1 | 11/2017 | Sakurai et al. | |
| 2017/0313902 A1 | 11/2017 | Shimazaki et al. | |

FOREIGN PATENT DOCUMENTS

| | | | |
|---|---|---|---|
| JP | 58-065774 A | * | 4/1983 |
| JP | 7-252452 A | | 10/1995 |
| JP | 8-127751 A | | 5/1996 |
| JP | 9-194788 A | | 7/1997 |
| JP | 9-208898 A | | 8/1997 |
| JP | 2001-194505 A | | 7/2001 |
| WO | WO 2007/102514 A1 | | 9/2007 |
| WO | WO 2016/068103 A1 | | 5/2016 |
| WO | WO 2016/068138 A1 | | 5/2016 |
| WO | WO 2017/185737 A1 | * | 11/2017 |
| WO | WO 2018/223501 | * | 12/2018 |

OTHER PUBLICATIONS

Machine translation of JP 58-065774 (no date).*
Machine translation of WO 2018/223501 (no date).*
International Search Report (PCT/ISA/210) issued in PCT/JP2018/011697, dated May 22, 2018.
Taiwanese Office Action and Search Report for Taiwanese Application No. 107110465, dated Jul. 2, 2021, with English translation.

* cited by examiner

Primary Examiner — Marc S Zimmer
(74) Attorney, Agent, or Firm — Birch, Stewart, Kolasch & Birch, LLP

(57) ABSTRACT

Although a composition for formation of a coating film is sometimes required to have satisfactory storage stability, it could not be said that a conventionally known composition has sufficient storage stability.

It is an object of the present invention to provide a composition comprising an organosilicon compound which is excellent in storage stability.

The present invention provides a composition comprising an organosilicon compound (A) represented by the following formula (a1), a metal compound (B) represented by the following formula (b1), a carboxylic acid compound (C), and an acid catalyst.

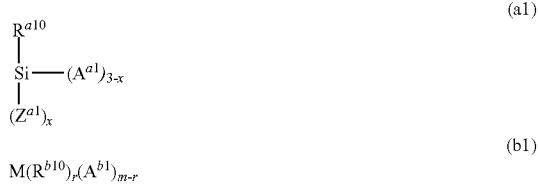

10 Claims, No Drawings

COMPOSITION

BACKGROUND OF THE INVENTION

Field of the Invention

The present invention relates to a composition comprising an organosilicon compound and a carboxylic acid compound.

Description of the Related Art

In various display devices, optical elements, semiconductor elements, building materials, automobile components, and nanoimprint techniques, adhesion of a liquid droplets onto a surface of a substrate may cause a problem of contamination and corrosion of the substrate, or further deterioration in performance due to the contamination and corrosion. Therefore, in these fields, the substrate surface is required to have satisfactory water repellency and oil repellency.

There has been known, as a composition capable of realizing a water-repellent/oil-repellent coating film, a composition including an organosiloxane as a main component. For example, JP 5-230375 A discloses a binary liquid mixture composition of a precursor (A) and a crosslinking agent (B), the precursor being a compound group of a combination of two or more liquid organosiloxanes each constituted of an $R^1$—Si group ($R^1$ is a monovalent hydrocarbon group) as an organosilicon group and an $OR^2$ group ($R^2$ is a hydrogen atom or a $C_1$-$C_5$ alkyl group or an acyl group) as a functional side chain. JP 5-230375 A mentions that the storage stability of the composition is improved by blocking the crosslinking agent (B) in advance with a keto/enol tautomeric compound such as a malonic acid diester or acetylacetone.

As mentioned in JP 5-230375 A, a composition for formation of a coating film is sometimes required to have satisfactory storage stability. As a result of the present inventors' study, it could not be said that sufficient storage stability is not achieved even by the composition disclosed in JP 5-230375 A.

SUMMARY OF THE INVENTION

Thus, it is an object of the present invention to provide a composition comprising an organosilicon compound, which is excellent in storage stability.

The present invention relates to a composition comprising the following organosilicon compound and carboxylic acid compound.

[1] A composition comprising:
an organosilicon compound (A1) represented by the following formula (a1),
a metal compound (B) represented by the following formula (b1),
a carboxylic acid compound (C), and
an acid catalyst:

[Chemical Formula 1]

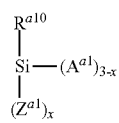  (a1)

wherein, in the formula (a1), $R^{a10}$ represents an alkyl group having 6 to 20 carbon atoms in which a part of methylene groups may be replaced by an oxygen atom and one or more hydrogen atoms may be replaced by a fluorine atom,
a plurality of $A^{a1}$ each independently represent a hydrolyzable group,
$Z^{a1}$ represents a hydrocarbon chain-containing group,
x is 0 or 1,
$Z^{a1}$ and $R^{a10}$ may be the same or different, and
$R^{a10}$ and $Z^{a1}$ may be the same or different between a plurality of formula (a1), and

[Chemical Formula 2]

$$M(R^{b10})_r(A^{b1})$$  (b1)

wherein, in the formula (b1),
$R^{b11}$ represents a hydrocarbon chain-containing group having 5 or less carbon atoms,
$A^{b1}$ each independently represent a hydrolyzable group,
M represents Al, Fe, In, Ge, Hf, Si, Ti, Sn, Zr or Ta,
m represents an integer of 1 to 5 according to a metal atom, and
r is 0 or 1.

[2] The composition according to [1], wherein the total concentration of the organosilicon compound (A1) represented by formula (a1), the metal compound (B) represented by formula (b1) and the carboxylic acid compound (C) is 0.02% by mass or more and 30% by mass or less.

[3] A composition comprising:
an organosilicon compound (A1) represented by the following formula (a1),
a metal compound (B) represented by the following formula (b1), and
a carboxylic acid compound (C), wherein
the total concentration of the organosilicon compound (A1) and the carboxylic acid compound (C) is 0.001% by mass or more and 3.5% by mass or less:

[Chemical Formula 3]

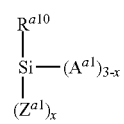  (a1)

wherein, in the formula (a1), $R^{a10}$ represents an alkyl group having 6 to 20 carbon atoms in which a part of methylene groups may be replaced by an oxygen atom and one or more hydrogen atoms may be replaced by a fluorine atom,
a plurality of $A^{a1}$ each independently represent a hydrolyzable group,
$Z^{a1}$ represents a hydrocarbon chain-containing group,
x is 0 or 1,
$Z^{a1}$ and $R^{a10}$ may be the same or different, and
$R^{a10}$ and $Z^{a1}$ may be the same or different between a plurality of formula (a1), and

[Chemical Formula 4]

$$M(R^{b10})_r(A^{b1})_{m-r}$$  (b1)

wherein, in the formula (b1),
$R^{b10}$ represents a hydrocarbon chain-containing group having 5 or less carbon atoms,
$A^{b1}$ each independently represent a hydrolyzable group,
M represents Al, Fe, In, Ge, Hf, Si, Ti, Sn, Zr or Ta,
m represents an integer of 1 to 5 according to a metal atom, and
r is 0 or 1.

[4] The composition according to any one of [1] to [3], wherein a molar ratio (B/A1) of the metal compound (B) to the organosilicon compound (A1) is 0.1 or more and 48 or less.

[5] The composition according to any one of [1] to [4], wherein the organosilicon compound (A1) is represented by the following formula (a1-2):

[Chemical Formula 5]

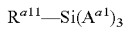
$$R^{a11}\text{—}Si(A^{a1})_3 \quad (a1\text{-}2)$$

wherein, in the formula (a1-2),
$R^{a11}$ is an alkyl group having 6 to 20 carbon atoms in which a hydrogen atom may be substituted with a fluorine atom, and
a plurality of $A^{a1}$ each independently represent a hydrolyzable group.

[6] A composition comprising:
an organosilicon compound (A2) represented by the following formula (a2),
a metal compound (B) represented by the following formula (b1), and
a carboxylic acid compound (C):

[Chemical Formula 6]

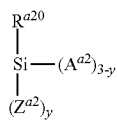

(a2)

wherein, in the formula (a2), $R^{a20}$ represents a trialkylsilyl group-containing molecular chain,
a plurality of $A^{a2}$ each independently represent a hydrolyzable group,
$Z^{a2}$ represents a trialkylsilyl group-containing molecular chain or a siloxane backbone-containing group, and
y is 0 or 1, and

[Chemical Formula 7]

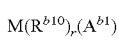
$$M(R^{b10})_r(A^{b1}) \quad (b1)$$

wherein, in the formula (b1),
$R^{b10}$ represents a hydrocarbon chain-containing group having 5 or less carbon atoms,
$A^{b1}$ each independently represent a hydrolyzable group,
M represents Al, Fe, In, Ge, Hf, Si, Ti, Sn, Zr or Ta,
m represents an integer of 1 to 5 according to a metal atom, and
r is 0 or 1.

[7] The composition according to [6], wherein the organosilicon compound (A2) is represented by the following formula (a2-2):

[Chemcial Formula 8]

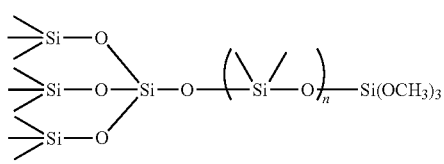

(a2-2)

wherein, in the formula (a2-2), n is 1 to 30.

[8] The composition according to [6] or [7], wherein a molar ratio (B/A2) of the metal compound (B) to the organosilicon compound (A2) is 0.1 or more and 48 or less.

[9] The composition according to any one of [1] to [8], wherein the amount of the carboxylic acid compound (C) is 1 to 21 parts by mass based on 100 parts by mass of the total amount of the organosilicon compound (A1) or the organosilicon compound (A2) and the metal compound (B).

[10] The composition according to any one of [1] to [9], wherein the metal compound (B) is represented by the following formula (b2):

[Chemical Formula 9]

$$Si(OR^{b11})_4 \quad (b2)$$

wherein, in the formula (b2), $R^{b11}$ is an alkyl group having 1 to 6 carbon atoms.

[11] The composition according to any one of [1] to [10], wherein the carboxylic acid compound (C) is a polyvalent carboxylic acid.

[12] The composition according to any one of [1] to [11], wherein the carboxylic acid compound (C) is represented by the following formula (c1):

[Chemical Formula 10]

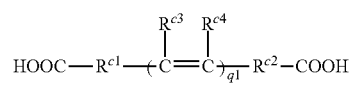

(c1)

wherein, in the formula (c1), $R^{c1}$ and $R^{c2}$ each independently represent a single bond, a divalent aliphatic hydrocarbon group having 1 to 10 carbon atoms which may have a carboxy group, or a divalent aromatic hydrocarbon group having 6 to 10 carbon atoms which may have a carboxy group,
$R^{c3}$ and $R^{c4}$ each independently represent an alkyl group having 1 to 10 carbon atoms which may have a carboxy group, or a hydrogen atom, and
q1 represents 0 or 1.

[13] The composition according to any one of [1] to [12], wherein the carboxylic acid compound (C) is represented by the following formula (c2):

[Chemcial Formula 11]

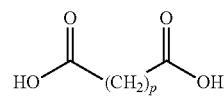

(c2)

wherein, in the formula (c2), p represents an integer of 0 to 2.

According to the present invention, it is possible to inhibit deterioration in performance of a coating film obtained from a composition after storage at normal temperature for a fixed time.

DETAILED DESCRIPTION OF THE INVENTION

The composition of the present invention is characterized in including, a carboxylic acid compound (C) and an acid catalyst, together with an organosilicon compound in which an alkyl group and a hydrolyzable group are bonded to a silicon atom (which is the below-mentioned organosilicon compound represented by formula (a1) and is referred to as organosilicon compound (A1)) and a metal compound (B) in which a hydrolyzable group is bonded to a metal atom (first composition). The presence of the carboxylic acid compound (C) and the acid catalyst in such a composition makes it possible to mitigate the hydrolysis/polycondensation reaction of the hydrolyzable group bonded to the silicon atom or the metal atom while allowing the reaction to proceed to some extent, whereby, the storage stability of the composition can be improved and also the abrasion resistance of the coating film can also be improved. The coating film formed by the hydrolysis/polycondensation of the hydrolyzable group mentioned above becomes a coating film having water repellency and oil repellency due to the alkyl group mentioned above.

Another aspect of the composition of the present invention is a composition comprising the organosilicon compound (A1), the metal compound (B) and the carboxylic acid compound (C) wherein the total concentration of the organosilicon compound (A1) and the carboxylic acid compound (C) in the composition is 0.001% by mass or more and 3.5% by mass or less (second composition). When the total concentration of the organosilicon compound (A1) and the carboxylic acid compound (C) is within a predetermined range, the storage stability of the composition can be improved.

Still another aspect of the composition of the present invention is a composition comprising an organosilicon compound in which a trialkylsilyl group-containing molecular chain and a hydrolyzable group are bonded to a silicon atom (which is the below-mentioned organosilicon compound represented by formula (a2) and is referred to as organosilicon compound (A2)), the metal compound (B) and the carboxylic acid compound (C) (third composition). Such a composition also enables an improvement in storage stability of the composition. The coating film formed by the hydrolysis/polycondensation of the hydrolyzable group mentioned above becomes a coating film having water repellency and oil repellency due to the trialkylsilyl group mentioned above.

In the present description, "metal" is used to include half metals such as Si and Ge.

Hereinafter, the organosilicon compounds (A1) and (A2) (both compounds are sometimes collectively referred to as organosilicon compound (A)), the metal compound (B) and the carboxylic acid compound (C) will be described in order.

1. Organosilicon Compound (A)

The organosilicon compound (A) in the present invention is a compound represented by the following formula (a1) or (a2).

1-1. Organosilicon Compound Represented by Formula (a1) (A1)

[Chemical Formula 12]

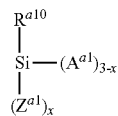

(a1)

In the formula (a1), $R^{a10}$ represents an alkyl group having 6 to 20 carbon atoms in which a part of methylene groups may be replaced by an oxygen atom, one or more hydrogen atoms may be replaced by a fluorine atom a plurality of $A^{a1}$ each independently represent a hydrolyzable group, $Z^{a1}$ represents a hydrocarbon chain-containing group, x is 0 or 1, $Z^{a1}$ and $R^{a10}$ may be the same or different, and $R^{a10}$ and $Z^{a1}$ may be the same or different between a plurality of formula (a1).

$R^{a10}$ is an alkyl group having 6 to 20 carbon atoms in which a part of methylene groups may be replaced by an oxygen atom and one or more hydrogen atoms may be replaced by a fluorine atom, and water repellency and oil repellency are imparted to a surface of a coating film obtained due to this alkyl group. Particularly, a friction coefficient between liquid droplets such as water droplets or oil droplets and the coating film decreases, thus making it easier for liquid droplets to move.

$R^{a10}$ is usually constituted only of a hydrocarbon chain and, if necessary, a part of methylene groups (—$CH_2$—) of this hydrocarbon chain may be replaced by an oxygen atom and a hydrogen atom may be replaced by a fluorine atom. Note that the methylene group adjacent to the Si atom is not replaced by an oxygen atom, and two successive methylene groups are not simultaneously replaced by an oxygen atom. The number of carbon atoms of $R^{a10}$ is preferably 7 or more, and more preferably 8 or more, and preferably 17 or less, and more preferably 15 or less.

$R^{a10}$ may be either branched or linear, and is preferably linear. $R^{a10}$ includes a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group and the like. Examples of the alkyl group in which a part of methylene groups (—$CH_2$—) of the hydrocarbon chain is/are replaced by an oxygen atom include a group including a (poly)ethylene glycol unit, a group including a (poly) propylene glycol unit and the like. Examples of the alkyl group in which one or more hydrogen atoms are replaced by a fluorine atom include a fluoroalkyl group whose end is trifluoromethyl.

$Z^{a1}$ is a hydrocarbon chain-containing group and means a group having a hydrocarbon chain in at least part of the constitution. The hydrocarbon chain-containing group of $Z^{a1}$ is usually constituted only of a hydrocarbon group (hydrocarbon chain) and, if necessary, a part of methylene groups of this hydrocarbon chain may be replaced by an oxygen atom. Even if the group is partially substituted with an oxygen atom, it is classified into the hydrocarbon chain-containing group because the hydrocarbon chain exists in the remaining part. Like $R^{a10}$, the methylene group adjacent to the Si atom is not replaced by an oxygen atom, and two successive methylene groups are not simultaneously replaced by an oxygen atom.

The number of carbon atoms of the hydrocarbon chain moiety of $Z^{a1}$ is preferably 1 or more and 20 or less, more preferably 1 or more and 10 or less, and still more preferably 1 or more and 5 or less. It is particularly preferable that $Z^{a1}$ is a hydrocarbon group and the number of carbon atoms is within the above range. The number of carbon atoms of the hydrocarbon chain moiety means the number of carbon atoms constituting a hydrocarbon group (hydrocarbon chain) in an oxygen-unsubstituted hydrocarbon chain-containing group, and means the number of carbon atoms when counting an oxygen atom as a methylene group in an oxygen-substituted hydrocarbon chain-containing group.

The longest chain length of the hydrocarbon chain moiety of $Z^{a1}$ is preferably shorter than the longest chain length of $R^{a10}$, and at this time, $Z^{a1}$ is more preferably a hydrocarbon group.

$Z^{a1}$ is preferably a saturated or unsaturated aliphatic hydrocarbon group, and more preferably a linear saturated aliphatic hydrocarbon group. The linear saturated aliphatic hydrocarbon group includes a methyl group, an ethyl group, a propyl group, a butyl group, a pentyl group and the like. When a part of methylene groups of the hydrocarbon chain is replaced by an oxygen atom, the hydrocarbon chain-containing group is preferably a saturated aliphatic hydrocarbon group, and specific examples thereof include a group including a (poly)ethylene glycol unit and the like.

x, which is the number of $Z^{a1}$, is 0 or 1, and x is preferably 0.

$A^{a1}$ represents a hydrolyzable group, and a plurality of $A^{a1}$ may be the same or different. The hydrolyzable group may be a group which gives a hydroxy group (silanol group) by hydrolysis, and examples thereof include an alkoxy group having 1 to 6 carbon atoms (the number of carbon atoms is preferably 1 to 4) such as a methoxy group, an ethoxy group, a propoxy group or a butoxy group, a hydroxy group, an acetoxy group, a chlorine atom, an isocyanate group and the like. Of these, $A^{a1}$ is preferably an alkoxy group having 1 to 4 carbon atoms, and more preferably an alkoxy group having 1 to 2 carbon atoms, and in these cases, it is still more preferable that a plurality of $A^{a1}$ are all the same.

The organosilicon compound represented by formula (a1) (A) is preferably an organosilicon compound in which $R^{a10}$ is an alkyl group having 6 to 20 carbon atoms (hydrogen atom may be replaced by a fluorine atom) and x is 0. Namely, preferable organosilicon compound (A) can be represented by the following formula (a1-2).

[Chemical Formula 13]

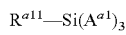

(a1-2)

In the formula (a1-2), $R^{a11}$ is an alkyl group having 6 to 20 carbon atoms in which a hydrogen atom may be substituted with a fluorine atom, and a plurality of $A^{a1}$ each independently represent a hydrolyzable group.

In the compound represented by formula (a1-2), $R^{a11}$ is preferably an unsubstituted alkyl group which is not substituted with a fluorine atom, and it is preferable that three $A^{a1}$ are all the same hydrolyzable group. Examples of such an organosilicon compound (A) include an alkyltrialkoxysilane which have an alkyl group having 6 to 20 carbon atoms, such as an alkyltrimethoxysilane which has an alkyl group having 6 to 20 carbon atoms or an alkyltriethoxysilane which has an alkyl group having 6 to 20 carbon atoms; an alkyltrihydroxysilane which has an alkyl group having 6 to 20 carbon atoms; an alkyltriacetoxysilane which has an alkyl group having 6 to 20 carbon atoms; an alkyltrichlorosilane which has an alkyl group having 6 to 20 carbon atoms; an alkyl triisocyanate silane which has an alkyl group having 6 to 20 carbon atoms and the like. Of these, an alkyltrimethoxysilane which has an alkyl group having 6 to 20 carbon atoms and an alkyltriethoxysilane which has an alkyl group having 6 to 20 carbon atoms are preferable.

1-2. Organosilicon Compound Represented by Formula (a2) (A2)

[Chemical Formula 14]

(a2)

In the formula (a2), $R^{a20}$ represents a trialkylsilyl group-containing molecular chain, a plurality of $A^{a2}$ each independently represent a hydrolyzable group, $Z^{a2}$ represents a trialkylsilyl group-containing molecular chain, or a siloxane backbone-containing group, and y is 0 or 1.

The trialkylsilyl group-containing molecular chain of $R^{a20}$ is a monovalent group having a structure in which a trialkylsilyl-containing group is bonded to the end of the molecular chain, and since the trialkylsilyl-containing group is bonded to the molecular chain, the water repellency and oil repellency of a coating film formed from the composition of the present invention are improved. The presence of the trialkylsilyl group-containing molecular chain reduces the friction between liquid droplets (water droplets, oil droplets, etc.) and the coating film, thus making it easier for liquid droplets to move. Even when the alkyl group of the trialkylsilyl-containing group is replaced by a fluoroalkyl group, it is possible to improve the water/oil repellency of an interface (surface) of the coating film, similarly.

The trialkylsilyl-containing group is a group having at least one trialkylsilyl group, preferably two or more trialkylsilyl groups, and still more preferably three trialkylsilyl groups. The trialkylsilyl-containing group is preferably a group represented by formula (s1).

[Chemical Formula 15]

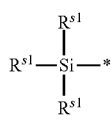

(s1)

In formula (s1), $R^{s1}$ represents a hydrocarbon group or a trialkylsilyloxy group, and a hydrogen atom included in the hydrocarbon group or the trialkylsilyloxy group may be substituted with a fluorine atom. The substitution number of a fluorine atom is preferably 1 or more, more preferably 3 or more, and preferably 2×A+1 or less when the number of carbon atoms is A. When a hydrogen atom included in the alkyl group is substituted with a fluorine atom, the number of alkyl groups to be substituted can be appropriately selected within a range of 1 to 3 per one silicon atom. When all of $R^{s1}$ are hydrocarbon groups, $R^{s1}$ is an alkyl group. * represents a bond.

When $R^{s1}$ is a hydrocarbon group, the number of carbon atoms thereof is preferably 1 to 4, more preferably 1 to 3, and still more preferably 1 to 2. When $R^{s1}$ is a hydrocarbon group, an aliphatic hydrocarbon group is preferable and an alkyl group is more preferable. Examples of the alkyl group include a methyl group, an ethyl group, a propyl group, a butyl group and the like. A plurality of $R^{s1}$ may be the same or different and are preferably the same. When all of $R^{s1}$ are hydrocarbon groups, the total number of carbon atoms of three $R^{s1}$ is preferably 9 or less, more preferably 6 or less, and still more preferably 4 or less. At least one of three $R^{s1}$ is preferably a methyl group, at least two thereof are more preferably methyl groups, and all of three $R^{s1}$ are particularly preferably methyl groups Specific examples of the group in which all of $R^{S1}$ are hydrocarbon groups (alkyl groups) (i.e., a group represented by formula (s1) is a trialkylsilyl group) include groups represented by the following formulas and the like. In formulas, * represents a bond.

[Chemical Formula 16]

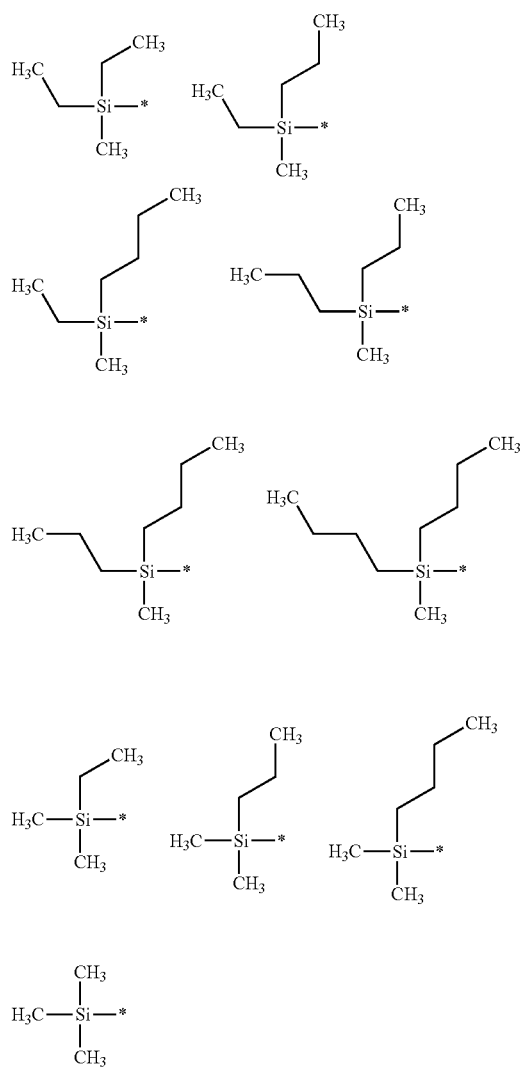

In the above formula (s1), at least one of $R^{s1}$ may be a trialkylsilyloxy group. In such a case, the trialkylsilyl group-containing molecular chain has a trialkylsilyl group. Examples of the trialkylsilyloxy group include groups in which an oxygen atom is bonded to a silicon atom of the group in which all of $R^{s1}$ are hydrocarbon groups (alkyl groups) (trialkylsilyl group). In the above formula (s1), all of $R^{s1}$ are also preferably trialkylsilyloxy groups.

Examples of the group in which at least one of $R^{s1}$ is a trialkylsilyloxy group include groups represented by the following formulas.

[Chemical Formula 17]

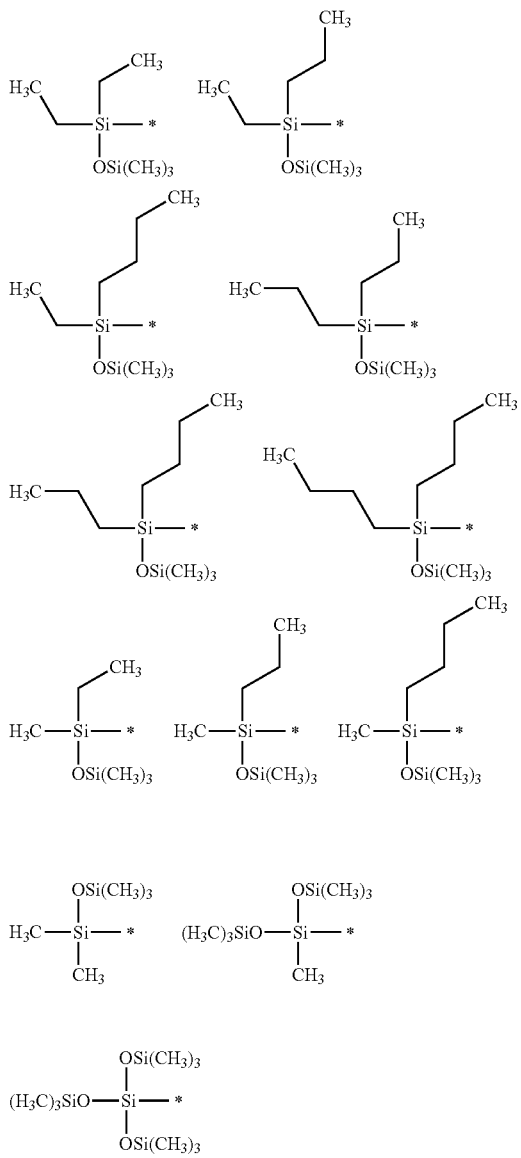

It is preferable that, in the trialkylsilyl group-containing molecular chain, the trialkylsilyl group is bonded to the end (free end side) of molecular chain, especially the end (free end side) of the main chain (longest linear chain) of the molecular chain.

The molecular chain, to which the trialkylsilyl group is bonded, is preferably linear or branched, and preferably linear. The molecular chain preferably has a dialkylsiloxane chain, and preferably has a linear dialkylsiloxane chain. The molecular chain may have a divalent hydrocarbon group. Even when a part of the molecular chain is a divalent hydrocarbon group, the remaining part is a dialkylsiloxane chain, the resulting coating film has satisfactory chemical/physical durability.

The molecular chain is preferably a compound represented by formula (s2).

[Chemical Formula 18]

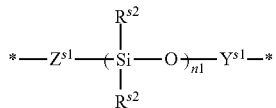

(s2)

In formula (s2), $R^{s2}$ represents an alkyl group having 1 to 4 carbon atoms, $Z^{s1}$ represents —O— or a divalent hydrocarbon group, and —$CH_2$— included in the divalent hydrocarbon group may be replaced by —O—, $Y^{s1}$ represents a single bond or —Si($R^{s2}$)$_2$-$L^{s1}$-, $L^{s1}$ represents a divalent hydrocarbon group, and —$CH_2$— included in the divalent hydrocarbon group may be replaced by —O—, n1 represents an integer of 1 or more, * at the left side represents a bond to the central silicon atom, and * at the right side represents a bond to a trialkylsilyl-containing group.

The number of carbon atoms of the alkyl group represented by $R^{s2}$ is preferably 1 to 4, more preferably 1 to 3, and still more preferably 1 to 2. Examples of the alkyl group represented by $R^{s2}$ include a methyl group, an ethyl group, a propyl group, a butyl group and the like, and a methyl group or an ethyl group is preferable, and a methyl group is particularly preferable.

n1 is preferably 1 to 100, more preferably 1 to 80, still more preferably 1 to 50, and particularly preferably 1 to 30.

The number of carbon atoms of the divalent hydrocarbon group represented by $Z^{s1}$ or $L^{s1}$ is preferably 1 to 10, more preferably 1 to 6, and still more preferably 1 to 4. The divalent hydrocarbon group is preferably chain, and may be either linear or branched when it is chain. The divalent hydrocarbon group is preferably a divalent aliphatic hydrocarbon group, and preferably an alkanediyl group. Examples of the divalent hydrocarbon group include alkanediyl groups such as a methylene group, an ethylene group, a propylene group and a butylene group.

A part of —$CH_2$— included in the divalent hydrocarbon group may be replaced by —O—. In this case, two successive —$CH_2$— are not simultaneously replaced by —O— and —$CH_2$-adjacent to the Si atom is not replaced by —O—. When two or more —$CH_2$— are replaced by —O—, the number of carbon atoms between —O— and —O— is preferably 2 to 4, and more preferably 2 to 3. Specific examples of the group in which a part of divalent hydrocarbon groups are replaced by —O— include a group including a (poly)ethylene glycol unit, a group including a (poly)propylene glycol unit and the like.

It is preferable that, in the formula (s2), $Z^{s1}$ is —O— and $Y^{s1}$ is a single bond, in other words, the molecular chain is constituted only by repetition of a dialkylsilyloxy group. When the dialkylsiloxane chain is constituted only by repetition of a dialkylsilyloxy group, the resulting coating film has satisfactory chemical/physical durability.

Examples of the molecular chain included in the trialkylsilyl group-containing molecular chain include molecular chains represented by the following formulas. In formulas, p1 represents an integer of 1 to 30, and * represents a bond bonded to a silicon atom forming a polysiloxane backbone or a trialkylsilyl group.

[Chemical Formula 19]

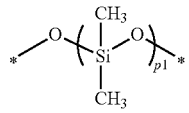

[Chemical Formula 20]

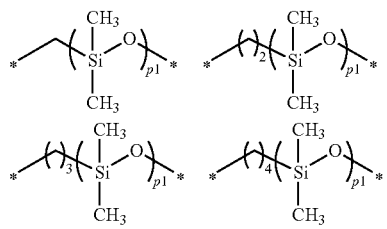

[Chemical Formula 21]

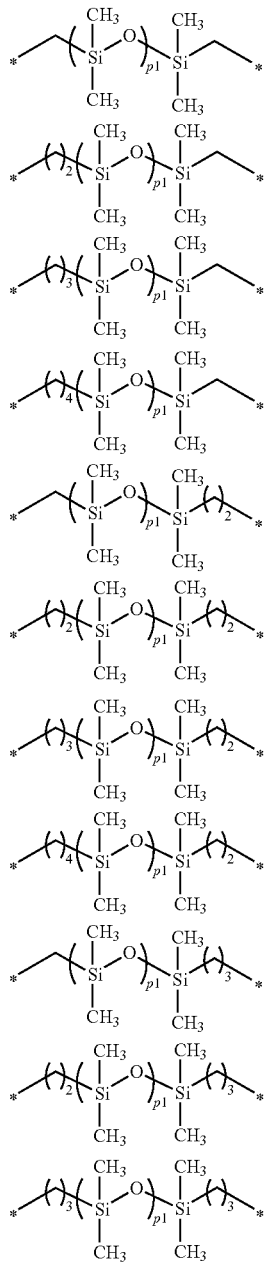

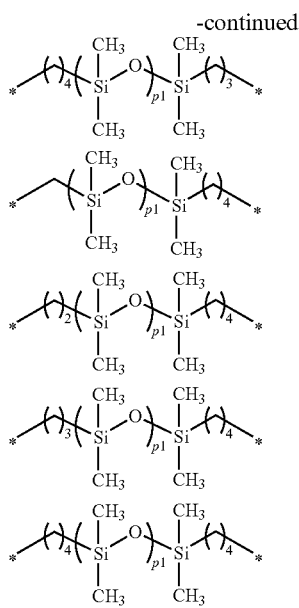

The total number of elements constituting the trialkylsilyl group-containing molecular chain is preferably 24 or more, more preferably 40 or more, and still more preferably 50 or more, and preferably 1,200 or less, more preferably 700 or less, and still more preferably 250 or less.

The trialkylsilyl group-containing molecular chain is preferably a group represented by the following formula (s3).

[Chemical Formula 22]

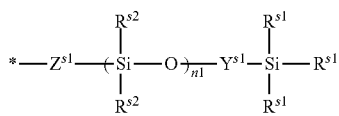

(s3)

In formula (s3), $R^{s1}$, $R^{s2}$, $Z^{s1}$, $Y^{s1}$, and n1 are the same as defined above, and * represents a bond to a silicon atom.

The trialkylsilyl group-containing molecular chain is more preferably a group represented by the following formula (s3-1), and still more preferably group represented by the following formula (s3-1-1).

[Chemical Formula 23]

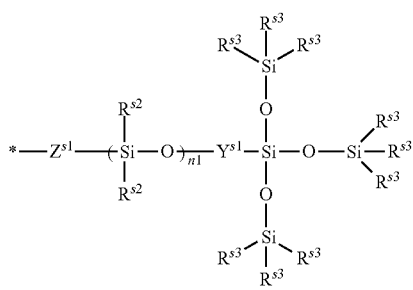

(s3-1)

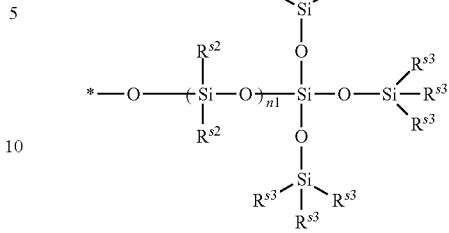

(s3-1-1)

In formula (s3-1) and (s3-1-1), $R^{s2}$, $Y^{s1}$, $Z^{s1}$, and n1 are the same as defined above. $R^{s3}$ represents an alkyl group having 1 to 4 carbon atoms. * represents a bond to a silicon atom.

The trialkylsilyl group-containing molecular chain is also preferably a group represented by the following formula (s3-2), and more preferably a group represented by the following formula (s3-2-1).

[Chemical Formula 24]

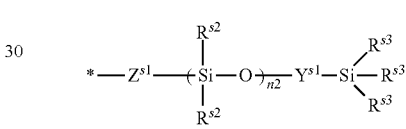

(s3-2)

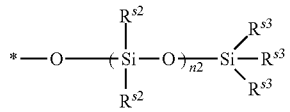

(s3-2-1)

In formula (s3-2) and formula (s3-2-1), $R^{s2}$, $R^{s3}$, $Y^{s1}$, and $Z^{s1}$ are the same as defined above, n2 represents an integer of 1 or more, and * represents a bond to a silicon atom.

n2 is preferably 1 to 100, more preferably 1 to 80, still more preferably 1 to 50, and particularly preferably 1 to 30.

The number of carbon atoms of the alkyl group represented by $R^{s3}$ is preferably 1 to 3, and more preferably 1 to 2. The total number of carbon atoms of $R^{s3}$ included in *—Si($R^{s3}$)$_3$ is preferably 9 or less, more preferably 6 or less, and still more preferably 4 or less. It is preferable that at least one of $R^{s3}$ included in *—Si($R^{s3}$)$_3$ is a methyl group, and two or more $R^{s3}$ are methyl groups, and it is particularly preferable that all of three $R^{s3}$ are methyl groups.

Examples of the trialkylsilyl group-containing molecular chain include a group represented by formula (s3-I).

[Chemical Formula 25]

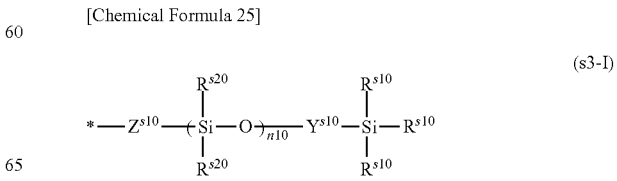

(s3-I)

TABLE 1

| | $Z^{s10}$ | $R^{s20}$ | n10 | $Y^{s10}$ | $R^{s10}$ |
|---|---|---|---|---|---|
| (s3-I-1) | *—O—* | $CH_3$—* | 1-30 | — | $(CH_3)_3SiO$—* |
| (s3-I-2) | *—O—* | $CH_3$—* | 1-30 | *—$Si(CH_3)_2$—$CH_2$—* | $(CH_3)_3SiO$—* |
| (s3-I-3) | *—O—* | $CH_3$—* | 1-30 | *—$Si(CH_3)_2$—$(CH_2)_2$—* | $(CH_3)_3SiO$—* |
| (s3-I-4) | *—O—* | $CH_3$—* | 1-30 | *—$Si(CH_3)_2$—$(CH_2)_3$—* | $(CH_3)_3SiO$—* |
| (s3-I-5) | *—O—* | $CH_3$—* | 1-30 | *—$Si(CH_3)_2$—$(CH_2)_4$—* | $(CH_3)_3SiO$—* |
| (s3-I-6) | *—$CH_2$—* | $CH_3$—* | 1-30 | — | $(CH_3)_3SiO$—* |
| (s3-I-7) | *—$CH_2$—* | $CH_3$—* | 1-30 | *—$Si(CH_3)_2$—$CH_2$—* | $(CH_3)_3SiO$—* |
| (s3-I-8) | *—$CH_2$—* | $CH_3$—* | 1-30 | *—$Si(CH_3)_2$—$(CH_2)_2$—* | $(CH_3)_3SiO$—* |
| (s3-I-9) | *—$CH_2$—* | $CH_3$—* | 1-30 | *—$Si(CH_3)_2$—$(CH_2)_3$—* | $(CH_3)_3SiO$—* |
| (s3-I-10) | *—$CH_2$—* | $CH_3$—* | 1-30 | *—$Si(CH_3)_2$—$(CH_2)_4$—* | $(CH_3)_3SiO$—* |
| (s3-I-11) | *—$(CH_2)_2$—* | $CH_3$—* | 1-30 | — | $(CH_3)_3SiO$—* |
| (s3-I-12) | *—$(CH_2)_2$—* | $CH_3$—* | 1-30 | *—$Si(CH_3)_2$—$CH_2$—* | $(CH_3)_3SiO$—* |
| (s3-I-13) | *—$(CH_2)_2$—* | $CH_3$—* | 1-30 | *—$Si(CH_3)_2$—$(CH_2)_2$—* | $(CH_3)_3SiO$—* |
| (s3-I-14) | *—$(CH_2)_2$—* | $CH_3$—* | 1-30 | *—$Si(CH_3)_2$—$(CH_2)_3$—* | $(CH_3)_3SiO$—* |
| (s3-I-15) | *—$(CH_2)_2$—* | $CH_3$—* | 1-30 | *—$Si(CH_3)_2$—$(CH_2)_4$—* | $(CH_3)_3SiO$—* |
| (s3-I-16) | *—$(CH_2)_3$—* | $CH_3$—* | 1-30 | — | $(CH_3)_3SiO$—* |
| (s3-I-17) | *—$(CH_2)_3$—* | $CH_3$—* | 1-30 | *—$Si(CH_3)_2$—$CH_2$—* | $(CH_3)_3SiO$—* |
| (s3-I-18) | *—$(CH_2)_3$—* | $CH_3$—* | 1-30 | *—$Si(CH_3)_2$—$(CH_2)_2$—* | $(CH_3)_3SiO$—* |
| (s3-I-19) | *—$(CH_2)_3$—* | $CH_3$—* | 1-30 | *—$Si(CH_3)_2$—$(CH_2)_3$—* | $(CH_3)_3SiO$—* |
| (s3-I-20) | *—$(CH_2)_3$—* | $CH_3$—* | 1-30 | *—$Si(CH_3)_2$—$(CH_2)_4$—* | $(CH_3)_3SiO$—* |
| (s3-I-21) | *—$(CH_2)_4$—* | $CH_3$—* | 1-30 | — | $(CH_3)_3SiO$—* |
| (s3-I-22) | *—$(CH_2)_4$—* | $CH_3$—* | 1-30 | *—$Si(CH_3)_2$—$CH_2$—* | $(CH_3)_3SiO$—* |
| (s3-I-23) | *—$(CH_2)_4$—* | $CH_3$—* | 1-30 | *—$Si(CH_3)_2$—$(CH_2)_2$—* | $(CH_3)_3SiO$—* |
| (s3-I-24) | *—$(CH_2)_4$—* | $CH_3$—* | 1-30 | *—$Si(CH_3)_2$—$(CH_2)_3$—* | $(CH_3)_3SiO$—* |
| (s3-I-25) | *—$(CH_2)_4$—* | $CH_3$—* | 1-30 | *—$Si(CH_3)_2$—$(CH_2)_4$—* | $(CH_3)_3SiO$—* |

TABLE 2

| | $Z^{s10}$ | $R^{s20}$ | n10 | $Y^{s10}$ | $R^{s10}$ |
|---|---|---|---|---|---|
| (s3-I-26) | *—O—* | $CH_3$—* | 1-30 | — | $CH_3$—* |
| (s3-I-27) | *—O—* | $CH_3$—* | 1-30 | *—$Si(CH_3)_2$—$CH_2$—* | $CH_3$—* |
| (s3-I-28) | *—O—* | $CH_3$—* | 1-30 | *—$Si(CH_3)_2$—$(CH_2)_2$—* | $CH_3$—* |
| (s3-I-29) | *—O—* | $CH_3$—* | 1-30 | *—$Si(CH_3)_2$—$(CH_2)_3$—* | $CH_3$—* |
| (s3-I-30) | *—O—* | $CH_3$—* | 1-30 | *—$Si(CH_3)_2$—$(CH_2)_4$—* | $CH_3$—* |
| (s3-I-31) | *—$CH_2$—* | $CH_3$—* | 1-30 | — | $CH_3$—* |
| (s3-I-32) | *—$CH_2$—* | $CH_3$—* | 1-30 | *—$Si(CH_3)_2$—$CH_2$—* | $CH_3$—* |
| (s3-I-33) | *—$CH_2$—* | $CH_3$—* | 1-30 | *—$Si(CH_3)_2$—$(CH_2)_2$—* | $CH_3$—* |
| (s3-I-34) | *—$CH_2$—* | $CH_3$—* | 1-30 | *—$Si(CH_3)_2$—$(CH_2)_3$—* | $CH_3$—* |
| (s3-I-35) | *—$CH_2$—* | $CH_3$—* | 1-30 | *—$Si(CH_3)_2$—$(CH_2)_4$—* | $CH_3$—* |
| (s3-I-36) | *—$(CH_2)_2$—* | $CH_3$—* | 1-30 | — | $CH_3$—* |
| (s3-I-37) | *—$(CH_2)_2$—* | $CH_3$—* | 1-30 | *—$Si(CH_3)_2$—$CH_2$—* | $CH_3$—* |
| (s3-I-38) | *—$(CH_2)_2$—* | $CH_3$—* | 1-30 | *—$Si(CH_3)_2$—$(CH_2)_2$—* | $CH_3$—* |
| (s3-I-39) | *—$(CH_2)_2$—* | $CH_3$—* | 1-30 | *—$Si(CH_3)_2$—$(CH_2)_3$—* | $CH_3$—* |
| (s3-I-40) | *—$(CH_2)_2$—* | $CH_3$—* | 1-30 | *—$Si(CH_3)_2$—$(CH_2)_4$—* | $CH_3$—* |
| (s3-I-41) | *—$(CH_2)_3$—* | $CH_3$—* | 1-30 | — | $CH_3$—* |
| (s3-I-42) | *—$(CH_2)_3$—* | $CH_3$—* | 1-30 | *—$Si(CH_3)_2$—$CH_2$—* | $CH_3$—* |
| (s3-I-43) | *—$(CH_2)_3$—* | $CH_3$—* | 1-30 | *—$Si(CH_3)_2$—$(CH_2)_2$—* | $CH_3$—* |
| (s3-I-44) | *—$(CH_2)_3$—* | $CH_3$—* | 1-30 | *—$Si(CH_3)_2$—$(CH_2)_3$—* | $CH_3$—* |
| (s3-I-45) | *—$(CH_2)_3$—* | $CH_3$—* | 1-30 | *—$Si(CH_3)_2$—$(CH_2)_4$—* | $CH_3$—* |
| (s3-I-46) | *—$(CH_2)_4$—* | $CH_3$—* | 1-30 | — | $CH_3$—* |
| (s3-I-47) | *—$(CH_2)_4$—* | $CH_3$—* | 1-30 | *—$Si(CH_3)_2$—$CH_2$—* | $CH_3$—* |
| (s3-I-48) | *—$(CH_2)_4$—* | $CH_3$—* | 1-30 | *—$Si(CH_3)_2$—$(CH_2)_2$—* | $CH_3$—* |
| (s3-I-49) | *—$(CH_2)_4$—* | $CH_3$—* | 1-30 | *—$Si(CH_3)_2$—$(CH_2)_3$—* | $CH_3$—* |
| (s3-I-50) | *—$(CH_2)_4$—* | $CH_3$—* | 1-30 | *—$Si(CH_3)_2$—$(CH_2)_4$—* | $CH_3$—* |

$A^{a2}$ in formula (a2) will be described below. A plurality of $A^{a2}$ are each independently a hydrolyzable group and may be a group which gives a hydroxy group (silanol group) by hydrolysis, and examples thereof preferably include an alkoxy group having 1 to 4 carbon atoms such as a methoxy group, an ethoxy group, a propoxy group or a butoxy group; a hydroxy group; an acetoxy group; a chlorine atom; an isocyanate group and the like. Of these, $A^{a2}$ is preferably an alkoxy group having 1 to 4 carbon atoms, and more preferably an alkoxy group having 1 to 2 carbon atoms.

$Z^{a2}$ in formula (a2) represents a trialkylsilyl group-containing molecular chain or a siloxane backbone-containing group. When $Z^{a2}$ is a trialkylsilyl group-containing molecular chain, examples thereof include those which are the same as for $R^{a20}$.

When $Z^{a2}$ is a siloxane backbone-containing group, the siloxane backbone-containing group is a monovalent group including a siloxane unit (Si—O—) and is preferably constituted of elements, whose number is smaller than that of elements constituting the trialkylsilyl group-containing molecular chain of $R^{a20}$. Whereby, the siloxane backbone-containing group becomes a group which has a length shorter than that of the trialkylsilyl group-containing molecular chain, or has small steric bulk (bulkiness). A divalent hydrocarbon group may be included in the siloxane backbone-containing group.

The siloxane backbone-containing group is preferably a group represented by the following formula (s4).

[Chemical Formula 26]

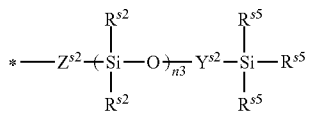
(s4)

In formula (s4), $R^{s2}$ is the same as defined above. $R^{s5}$ represents a hydrocarbon group or a hydroxy group, —$CH_2$— included in the hydrocarbon group may be replaced by —O—, and a hydrogen atom included in the hydrocarbon group may be substituted with a fluorine atom, $Z^{s2}$ represents —O— or a divalent hydrocarbon group, and —$CH_2$— included in the divalent hydrocarbon group may be replaced by —O—. $Y^{s2}$ represents a single bond or —$Si(R^{s2})_2$-$L^{s2}$-, $L^{s2}$ represents a divalent hydrocarbon group, and —$CH_2$— included in the divalent hydrocarbon group may be replaced by —O—, n3 represents an integer of 0 to 5, and * represents a bond to a silicon atom.

Examples of the hydrocarbon group represented by $R^{s5}$ include a group which is the same as the hydrocarbon group represented by $R^{s1}$, and an aliphatic hydrocarbon group is preferable and an alkyl group is more preferable. The number of carbon atoms is preferably 1 to 4, more preferably 1 to 3, and still more preferably 1 to 2.

Examples of the divalent hydrocarbon group represented by $Z^{s2}$ or $L^{s2}$ include a group which is the same as the divalent hydrocarbon group represented by $Z^{s1}$, and the number of carbon atoms is preferably 1 to 10, more preferably 1 to 6, and still more preferably 1 to 4. The divalent hydrocarbon group represented by $Z^{s2}$ or $L^{s2}$ is preferably a divalent aliphatic hydrocarbon group, and more preferably a linear or branched alkanediyl group.

n3 is preferably 1 to 5, and more preferably 1 to 3.

The total number of elements of the siloxane backbone-containing group is preferably 100 or less, more preferably 50 or less, still more preferably 30 or less, and preferably 10 or more. A difference in the number of elements between the trialkylsilyl group-containing molecular chain of $R^{a20}$ and the siloxane backbone-containing group of $Z^{a2}$ is preferably 10 or more, and more preferably 20 or more, and preferably 1,000 or less, more preferably 500 or less, and still more preferably 200 or less.

Specific examples of the siloxane backbone-containing group include groups represented by the following formulas.

[Chemical Formula 27]

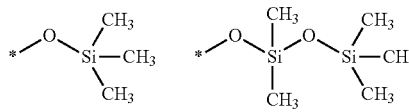

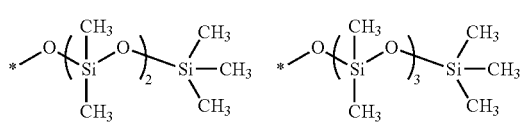

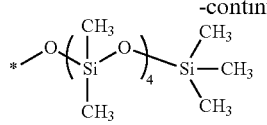

-continued

In formula (a2), y is 0 or 1, and preferably 0.

The organosilicon compound represented by formula (a2) (A) is preferably a compound represented by the following formula (I-1), and more preferably a compound represented by formula (I-1-1).

[Chemical Formula 28]

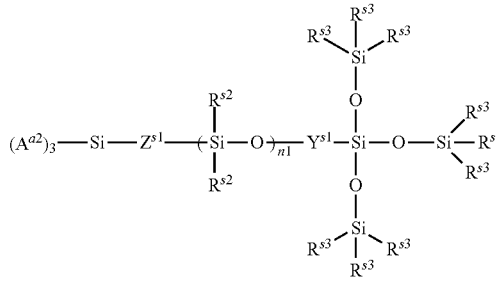
(I-1)

(I-1-1)

In formula (I-1) and (I-1-1), $A^{a2}$, $Y^{s1}$, $Z^{s1}$, $R^{s2}$, $R^{s3}$, and n1 are respectively the same as defined above.

The organosilicon compound represented by formula (a2) (A) may be a compound represented by formula (I-2), and preferably a compound represented by formula (I-2-1).

[Chemical Formula 29]

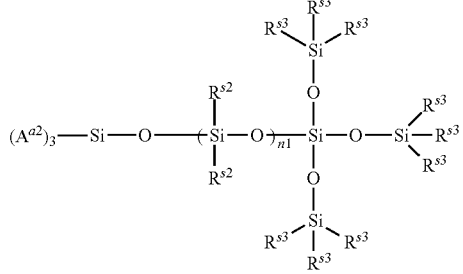
(I-2)

(I-2-1)

In formula (I-2) and formula (I-2-1), $A^{a2}$, $Y^{S1}$, $Z^{S1}$, $R^{s2}$, $R^{s3}$, and n2 are respectively the same as defined above.

Specific examples of the organosilicon compound represented by formula (a2) (A) include a group represented by formula (I-I).

[Chemical Formula 30]

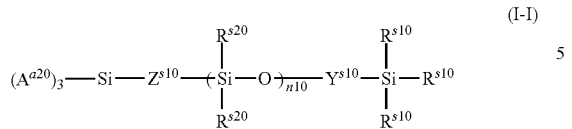

(I-I)

TABLE 3

| | $A^{a20}$ | $Z^{s10}$ | $R^{s20}$ | n10 | $Y^{s10}$ | $R^{s10}$ |
|---|---|---|---|---|---|---|
| (I-I-1) | $C_2H_5O$—* | *—O—* | $CH_3$—* | 1-30 | — | $(CH_3)_3SiO$—* |
| (I-I-2) | $C_2H_5O$—* | *—O—* | $CH_3$—* | 1-30 | *—$Si(CH_3)_2$—$CH_2$—* | $(CH_3)_3SiO$—* |
| (I-I-3) | $C_2H_5O$—* | *—O—* | $CH_3$—* | 1-30 | *—$Si(CH_3)_2$—$(CH_2)_2$—* | $(CH_3)_3SiO$—* |
| (I-I-4) | $C_2H_5O$—* | *—O—* | $CH_3$—* | 1-30 | *—$Si(CH_3)_2$—$(CH_2)_3$—* | $(CH_3)_3SiO$—* |
| (I-I-5) | $C_2H_5O$—* | *—O—* | $CH_3$—* | 1-30 | *—$Si(CH_3)_2$—$(CH_2)_4$—* | $(CH_3)_3SiO$—* |
| (I-I-6) | $C_2H_5O$—* | *—$CH_2$—* | $CH_3$—* | 1-30 | — | $(CH_3)_3SiO$—* |
| (I-I-7) | $C_2H_5O$—* | *—$CH_2$—* | $CH_3$—* | 1-30 | *—$Si(CH_3)_2$—$CH_2$—* | $(CH_3)_3SiO$—* |
| (I-I-8) | $C_2H_5O$—* | *—$CH_2$—* | $CH_3$—* | 1-30 | *—$Si(CH_3)_2$—$(CH_2)_2$—* | $(CH_3)_3SiO$—* |
| (I-I-9) | $C_2H_5O$—* | *—$CH_2$—* | $CH_3$—* | 1-30 | *—$Si(CH_3)_2$—$(CH_2)_3$—* | $(CH_3)_3SiO$—* |
| (I-I-10) | $C_2H_5O$—* | *—$CH_2$—* | $CH_3$—* | 1-30 | *—$Si(CH_3)_2$—$(CH_2)_4$—* | $(CH_3)_3SiO$—* |
| (I-I-11) | $C_2H_5O$—* | *—$(CH_2)_2$—* | $CH_3$—* | 1-30 | — | $(CH_3)_3SiO$—* |
| (I-I-12) | $C_2H_5O$—* | *—$(CH_2)_2$—* | $CH_3$—* | 1-30 | *—$Si(CH_3)_2$—$CH_2$—* | $(CH_3)_3SiO$—* |
| (I-I-13) | $C_2H_5O$—* | *—$(CH_2)_2$—* | $CH_3$—* | 1-30 | *—$Si(CH_3)_2$—$(CH_2)$—* | $(CH_3)_3SiO$—* |
| (I-I-14) | $C_2H_5O$—* | *—$(CH_2)_2$—* | $CH_3$—* | 1-30 | *—$Si(CH_3)_2$—$(CH_2)_3$—* | $(CH_3)_3SiO$—* |
| (I-I-15) | $C_2H_5O$—* | *—$(CH_2)_2$—* | $CH_3$—* | 1-30 | *—$Si(CH_3)_2$—$(CH_2)_4$—* | $(CH_3)_3SiO$—* |
| (I-I-16) | $C_2H_5O$—* | *—$(CH_2)_3$—* | $CH_3$—* | 1-30 | — | $(CH_3)_3SiO$—* |
| (I-I-17) | $C_2H_5O$—* | *—$(CH_2)_3$—* | $CH_3$—* | 1-30 | *—$Si(CH_3)_2$—$CH_2$—* | $(CH_3)_3SiO$—* |
| (I-I-18) | $C_2H_5O$—* | *—$(CH_2)_3$—* | $CH_3$—* | 1-30 | *—$Si(CH_3)_2$—$(CH_2)_2$—* | $(CH_3)_3SiO$—* |
| (I-I-19) | $C_2H_5O$—* | *—$(CH_2)_3$—* | $CH_3$—* | 1-30 | *—$Si(CH_3)_2$—$(CH_2)_3$—* | $(CH_3)_3SiO$—* |
| (I-I-20) | $C_2H_5O$—* | *—$(CH_2)_3$—* | $CH_3$—* | 1-30 | *—$Si(CH_3)_2$—$(CH_2)_4$—* | $(CH_3)_3SiO$—* |
| (I-I-21) | $C_2H_5O$—* | *—$(CH_2)_4$—* | $CH_3$—* | 1-30 | — | $(CH_3)_3SiO$—* |
| (I-I-22) | $C_2H_5O$—* | *—$(CH_2)_4$—* | $CH_3$—* | 1-30 | *—$Si(CH_3)_2$—$CH_2$—* | $(CH_3)_3SiO$—* |
| (I-I-23) | $C_2H_5O$—* | *—$(CH_2)_4$—* | $CH_3$—* | 1-30 | *—$Si(CH_3)_2$—$(CH_2)_2$—* | $(CH_3)_3SiO$—* |
| (I-I-24) | $C_2H_5O$—* | *—$(CH_2)_4$—* | $CH_3$—* | 1-30 | *—$Si(CH_3)_2$—$(CH_2)_3$—* | $(CH_3)_3SiO$—* |
| (I-I-25) | $C_2H_5O$—* | *—$(CH_2)_4$—* | $CH_3$—* | 1-30 | *—$Si(CH_3)_2$—$(CH_2)_4$—* | $(CH_3)_3SiO$—* |
| (I-I-26) | $CH_3O$—* | *—O—* | $CH_3$—* | 1-30 | — | $(CH_3)_3SiO$—* |
| (I-I-27) | $CH_3O$—* | *—O—* | $CH_3$—* | 1-30 | *—$Si(CH_3)_2$—$CH_2$—* | $(CH_3)_3SiO$—* |
| (I-I-28) | $CH_3O$—* | *—O—* | $CH_3$—* | 1-30 | *—$Si(CH_3)_2$—$(CH_2)_2$—* | $(CH_3)_3SiO$—* |
| (I-I-29) | $CH_3O$—* | *—O—* | $CH_3$—* | 1-30 | *—$Si(CH_3)_2$—$(CH_2)_3$—* | $(CH_3)_3SiO$—* |
| (I-I-30) | $CH_3O$—* | *—O—* | $CH_3$—* | 1-30 | *—$Si(CH_3)_2$—$(CH_2)_4$—* | $(CH_3)_3SiO$—* |
| (I-I-31) | $CH_3O$—* | *—$CH_2$—* | $CH_3$—* | 1-30 | — | $(CH_3)_3SiO$—* |
| (I-I-32) | $CH_3O$—* | *—$CH_2$—* | $CH_3$—* | 1-30 | *—$Si(CH_3)_2$—$CH_2$—* | $(CH_3)_3SiO$—* |
| (I-I-33) | $CH_3O$—* | *—$CH_2$—* | $CH_3$—* | 1-30 | *—$Si(CH_3)_2$—$(CH_2)_2$—* | $(CH_3)_3SiO$—* |
| (I-I-34) | $CH_3O$—* | *—$CH_2$—* | $CH_3$—* | 1-30 | *—$Si(CH_3)_2$—$(CH_2)_3$—* | $(CH_3)_3SiO$—* |
| (I-I-35) | $CH_3O$—* | *—$CH_2$—* | $CH_3$—* | 1-30 | *—$Si(CH_3)_2$—$(CH_2)_4$—* | $(CH_3)_3SiO$—* |
| (I-I-36) | $CH_3O$—* | *—$(CH_2)_2$—* | $CH_3$—* | 1-30 | — | $(CH_3)_3SiO$—* |
| (I-I-37) | $CH_3O$—* | *—$(CH_2)_2$—* | $CH_3$—* | 1-30 | *—$Si(CH_3)_2$—$CH_2$—* | $(CH_3)_3SiO$—* |
| (I-I-38) | $CH_3O$—* | *—$(CH_2)_2$—* | $CH_3$—* | 1-30 | *—$Si(CH_3)_2$—$(CH_2)_2$—* | $(CH_3)_3SiO$—* |
| (I-I-39) | $CH_3O$—* | *—$(CH_2)_2$—* | $CH_3$—* | 1-30 | *—$Si(CH_3)_2$—$(CH_2)_3$—* | $(CH_3)_3SiO$—* |
| (I-I-40) | $CH_3O$—* | *—$(CH_2)_2$—* | $CH_3$—* | 1-30 | *—$Si(CH_3)_2$—$(CH_2)_4$—* | $(CH_3)_3SiO$—* |
| (I-I-41) | $CH_3O$—* | *—$(CH_2)_3$—* | $CH_3$—* | 1-30 | — | $(CH_3)_3SiO$—* |
| (I-I-42) | $CH_3O$—* | *—$(CH_2)_3$—* | $CH_3$—* | 1-30 | *—$Si(CH_3)_2$—$CH_2$—* | $(CH_3)_3SiO$—* |
| (I-I-43) | $CH_3O$—* | *—$(CH_2)_3$—* | $CH_3$—* | 1-30 | *—$Si(CH_3)_2$—$(CH_2)_2$—* | $(CH_3)_3SiO$—* |
| (I-I-44) | $CH_3O$—* | *—$(CH_2)_3$—* | $CH_3$—* | 1-30 | *—$Si(CH_3)_2$—$(CH_2)_3$—* | $(CH_3)_3SiO$—* |
| (I-I-45) | $CH_3O$—* | *—$(CH_2)_3$—* | $CH_3$—* | 1-30 | *—$Si(CH_3)_2$—$(CH_2)_4$—* | $(CH_3)_3SiO$—* |
| (I-I-46) | $CH_3O$—* | *—$(CH_2)_4$—* | $CH_3$—* | 1-30 | — | $(CH_3)_3SiO$—* |
| (I-I-47) | $CH_3O$—* | *—$(CH_2)_4$—* | $CH_3$—* | 1-30 | *—$Si(CH_3)_2$—$CH_2$—* | $(CH_3)_3SiO$—* |
| (I-I-48) | $CH_3O$—* | *—$(CH_2)_4$—* | $CH_3$—* | 1-30 | *—$Si(CH_3)_2$—$(CH_2)_2$—* | $(CH_3)_3SiO$—* |
| (I-I-49) | $CH_3O$—* | *—$(CH_2)_4$—* | $CH_3$—* | 1-30 | *—$Si(CH_3)_2$—$(CH_2)_3$—* | $(CH_3)_3SiO$—* |
| (I-I-50) | $CH_3O$—* | *—$(CH_2)_4$—* | $CH_3$—* | 1-30 | *—$Si(CH_3)_2$—$(CH_2)_4$—* | $(CH_3)_3SiO$—* |

TABLE 4

| | $A^{a10}$ | $Z^{s10}$ | $R^{s20}$ | n10 | $Y^{s10}$ | $R^{s10}$ |
|---|---|---|---|---|---|---|
| (I-I-51) | $C_2H_5O$—* | *—O—* | $CH_3$—* | 1-30 | — | $CH_3$—* |
| (I-I-52) | $C_2H_5O$—* | *—O—* | $CH_3$—* | 1-30 | *—$Si(CH_3)_2$—$CH_2$—* | $CH_3$—* |
| (I-I-53) | $C_2H_5O$—* | *—O—* | $CH_3$—* | 1-30 | *—$Si(CH_3)_2$—$(CH_2)_2$—* | $CH_3$—* |
| (I-I-54) | $C_2H_5O$—* | *—O—* | $CH_3$—* | 1-30 | *—$Si(CH_3)_2$—$(CH_2)_3$—* | $CH_3$—* |
| (I-I-55) | $C_2H_5O$—* | *—O—* | $CH_3$—* | 1-30 | *—$Si(CH_3)_2$—$(CH_2)_4$—* | $CH_3$—* |
| (I-I-56) | $C_2H_5O$—* | *—$CH_2$—* | $CH_3$—* | 1-30 | — | $CH_3$—* |
| (I-I-57) | $C_2H_5O$—* | *—$CH_2$—* | $CH_3$—* | 1-30 | *—$Si(CH_3)_2$—$CH_2$—* | $CH_3$—* |
| (I-I-58) | $C_2H_5O$—* | *—$H_2$—* | $CH_3$—* | 1-30 | *—$Si(CH_3)_2$—$(CH_2)_2$—* | $CH_3$—* |

TABLE 4-continued

| | $A^{a10}$ | $Z^{s10}$ | $R^{s20}$ | n10 | $Y^{s10}$ | $R^{s10}$ |
|---|---|---|---|---|---|---|
| (I-I-59) | $C_2H_5O$—* | *—$CH_2$—* | $CH_3$—* | 1-30 | *—$Si(CH_3)_2$—$(CH_2)_3$—* | $CH_3$—* |
| (I-I-60) | $C_2H_5O$—* | *—$CH_2$—* | $CH_3$—* | 1-30 | *—$Si(CH_3)_2$—$(CH_2)_4$—* | $CH_3$—* |
| (I-I-61) | $C_2H_5O$—* | *—$(CH_2)_2$—* | $CH_3$—* | 1-30 | — | $CH_3$—* |
| (I-I-62) | $C_2H_5O$—* | *—$(CH_2)_2$—* | $CH_3$—* | 1-30 | *—$Si(CH_3)_2$—$CH_2$—* | $CH_3$—* |
| (I-I-63) | $C_2H_5O$—* | *—$(CH_2)_2$—* | $CH_3$—* | 1-30 | *—$Si(CH_3)_2$—$(CH_2)_2$—* | $CH_3$—* |
| (I-I-64) | $C_2H_5O$—* | *—$(CH_2)_2$—* | $CH_3$—* | 1-30 | *—$Si(CH_3)_2$—$(CH_2)_3$—* | $CH_3$—* |
| (I-I-65) | $C_2H_5O$—* | *—$(CH_2)_2$—* | $CH_3$—* | 1-30 | *—$Si(CH_3)_2$—$(CH_2)_4$—* | $CH_3$—* |
| (I-I-66) | $C_2H_5O$—* | *—$(CH_2)_3$—* | $CH_3$—* | 1-30 | — | $CH_3$—* |
| (I-I-67) | $C_2H_5O$—* | *—$(CH_2)_3$—* | $CH_3$—* | 1-30 | *—$Si(CH_3)_2$—$CH_2$—* | $CH_3$—* |
| (I-I-68) | $C_2H_5O$—* | *—$(CH_2)_3$—* | $CH_3$—* | 1-30 | *—$Si(CH_3)_2$—$(CH_2)_2$—* | $CH_3$—* |
| (I-I-69) | $C_2H_5O$—* | *—$(CH_2)_3$—* | $CH_3$—* | 1-30 | *—$Si(CH_3)_2$—$(CH_2)_3$—* | $CH_3$—* |
| (I-I-70) | $C_2H_5O$—* | *—$(CH_2)_3$—* | $CH_3$—* | 1-30 | *—$Si(CH_3)_2$—$(CH_2)_4$—* | $CH_3$—* |
| (I-I-71) | $C_2H_5O$—* | *—$(CH_2)_4$—* | $CH_3$—* | 1-30 | — | $CH_3$—* |
| (I-I-72) | $C_2H_5O$—* | *—$(CH_2)_4$—* | $CH_3$—* | 1-30 | *—$Si(CH_3)_2$—$CH_2$—* | $CH_3$—* |
| (I-I-73) | $C_2H_5O$—* | *—$(CH_2)_4$—* | $CH_3$—* | 1-30 | *—$Si(CH_3)_2$—$(CH_2)_2$—* | $CH_3$—* |
| (I-I-74) | $C_2H_5O$—* | *—$(CH_2)_4$—* | $CH_3$—* | 1-30 | *—$Si(CH_3)_2$—$(CH_2)_3$—* | $CH_3$—* |
| (I-I-75) | $C_2H_5O$—* | *—$(CH_2)_4$—* | $CH_3$—* | 1-30 | *—$Si(CH_3)_2$—$(CH_2)_4$—* | $CH_3$—* |
| (I-I-76) | $CH_3O$—* | *—O—* | $CH_3$—* | 1-30 | — | $CH_3$—* |
| (I-I-77) | $CH_3O$—* | *—O—* | $CH_3$—* | 1-30 | *—$Si(CH_3)_2$—$CH_2$—* | $CH_3$—* |
| (I-I-78) | $CH_3O$—* | *—O—* | $CH_3$—* | 1-30 | *—$Si(CH_3)_2$—$(CH_2)_2$—* | $CH_3$—* |
| (I-I-79) | $CH_3O$—* | *—O—* | $CH_3$—* | 1-30 | *—$Si(CH_3)_2$—$(CH_2)_3$—* | $CH_3$—* |
| (I-I-80) | $CH_3O$—* | *—O—* | $CH_3$—* | 1-30 | *—$Si(CH_3)_2$—$(CH_2)_4$—* | $CH_3$—* |
| (I-I-81) | $CH_3O$—* | *—$CH_2$—* | $CH_3$—* | 1-30 | — | $CH_3$—* |
| (I-I-82) | $CH_3O$—* | *—$CH_2$—* | $CH_3$—* | 1-30 | *—$Si(CH_3)_2$—$CH_2$—* | $CH_3$—* |
| (I-I-83) | $CH_3O$—* | *—$CH_2$—* | $CH_3$—* | 1-30 | *—$Si(CH_3)_2$—$(CH_2)_2$—* | $CH_3$—* |
| (I-I-84) | $CH_3O$—* | *—$CH_2$—* | $CH_3$—* | 1-30 | *—$Si(CH_3)_2$—$(CH_2)_3$—* | $CH_3$—* |
| (I-I-85) | $CH_3O$—* | *—$CH_2$—* | $CH_3$—* | 1-30 | *—$Si(CH_3)_2$—$(CH_2)_4$—* | $CH_3$—* |
| (I-I-86) | $CH_3O$—* | *—$(CH_2)_2$—* | $CH_3$—* | 1-30 | — | $CH_3$—* |
| (I-I-87) | $CH_3O$—* | *—$(CH_2)_2$—* | $CH_3$—* | 1-30 | *—$Si(CH_3)_2$—$CH_2$—* | $CH_3$—* |
| (I-I-88) | $CH_3O$—* | *—$(CH_2)_2$—* | $CH_3$—* | 1-30 | *—$Si(CH_3)_2$—$(CH_2)_2$—* | $CH_3$—* |
| (I-I-89) | $CH_3O$—* | *—$(CH_2)_2$—* | $CH_3$—* | 1-30 | *—$Si(CH_3)_2$—$(CH_2)_3$—* | $CH_3$—* |
| (I-I-90) | $CH_3O$—* | *—$(CH_2)_2$—* | $CH_3$—* | 1-30 | *—$Si(CH_3)_2$—$(CH_2)_4$—* | $CH_3$—* |
| (I-I-91) | $CH_3O$—* | *—$(CH_2)_3$—* | $CH_3$—* | 1-30 | — | $CH_3$—* |
| (I-I-92) | $CH_3O$—* | *—$(CH_2)_3$—* | $CH_3$—* | 1-30 | *—$Si(CH_3)_2$—$CH_2$—* | $CH_3$—* |
| (I-I-93) | $CH_3O$—* | *—$(CH_2)_3$—* | $CH_3$—* | 1-30 | *—$Si(CH_3)_2$—$(CH_2)_2$—* | $CH_3$—* |
| (I-I-94) | $CH_3O$—* | *—$(CH_2)_3$—* | $CH_3$—* | 1-30 | *—$Si(CH_3)_2$—$(CH_2)_3$—* | $CH_3$—* |
| (I-I-95) | $CH_3O$—* | *—$(CH_2)_3$—* | $CH_3$—* | 1-30 | *—$Si(CH_3)_2$—$(CH_2)_4$—* | $CH_3$—* |
| (I-I-96) | $CH_3O$—* | *—$(CH_2)_4$—* | $CH_3$—* | 1-30 | — | $CH_3$—* |
| (I-I-97) | $CH_3O$—* | *—$(CH_2)_4$—* | $CH_3$—* | 1-30 | *—$Si(CH_3)_2$—$CH_2$—* | $CH_3$—* |
| (I-I-98) | $CH_3O$—* | *—$(CH_2)_4$—* | $CH_3$—* | 1-30 | *—$Si(CH_3)_2$—$(CH_2)_2$—* | $CH_3$—* |
| (I-I-99) | $CH_3O$—* | *—$(CH_2)_4$—* | $CH_3$—* | 1-30 | *—$Si(CH_3)_2$—$(CH_2)_3$—* | $CH_3$—* |
| (I-I-100) | $CH_3O$—* | *—$(CH_2)_4$—* | $CH_3$—* | 1-30 | *—$Si(CH_3)_2$—$(CH_2)_4$—* | $CH_3$—* |

Those represented by formula (I-I-26) among the formula (I-I) are more preferable. Namely, the organosilicon compound represented by formula (a2) (A) is preferably an organosilicon compound represented by the following formula (a2-2).

[Chemical Formula 31]

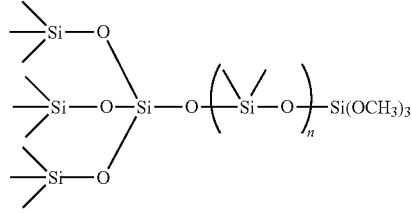

(a2-2)

In the formula (a2-2), n is 1 to 30.

Examples of a method for synthesis of the organosilicon compound represented by formula (a2) (A) include the following methods. According to a first method, the organosilicon compound can be produced by reacting a compound in which a trialkylsilyl group-containing molecular chain and a halogen atom (preferably a chlorine atom) are bonded with a compound in which three or more (particularly four) hydrolyzable groups are bonded to a silicon atom.

According to a second synthesis method, the organosilicon compound can be produced by reacting a compound in which a halogen atom is bonded to both ends of a dialkylsiloxane chain (hereinafter referred to as "dihalogenated dialkyl siloxane") with a compound in which a tris(trialkylsilyloxy)silyl group and an $M^1O$— group ($M^1$ represents an alkali metal) are bonded (hereinafter referred to as "alkali metal silyloxide") and a compound in which four hydrolyzable groups are bonded to a silicon atom. Although there is no limitation on the reaction order of these compounds, it is preferable that, first, a dihalogenated dialkyl siloxane is reacted with an alkali metal silyloxide, followed by a reaction with a compound in which four hydrolyzable groups are bonded to a silicon atom.

Examples of the halogen atom include a fluorine atom, a chlorine atom, a bromine atom, an iodine atom and the like, and a chlorine atom is preferable. The alkali metal is preferably lithium. The alkali metal silyloxide can be produced, for example, by reacting a compound in which a tris(trialkylsilyloxy)silyl group and a hydroxy group are bonded with an alkyl alkali metal. Examples of the organic alkali metal compound include alkyllithiums such as n-butyllithium, sec-butyllithium and tert-butyllithium, and n-butyllithium is particularly preferable.

According to a third synthesis method, the organosilicon compound can also be produced, for example, by reacting an alkali metal silyloxide with a cyclic dimethylsiloxane, followed by a reaction with a compound in which three hydrolyzable groups and one halogen atom (particularly a chlorine atom) are bonded to a silicon atom. The number of silicon atoms included in the cyclic dimethylsiloxane is preferably, 2 or more and 10 or less, more preferably 2 or more and 5 or less, and still more preferably 2 or more and 4 or less.

2. Metal Compound (B)

The metal compound (B) is a compound in which a hydrolyzable group is bonded to a metal atom M, as represented by the following formula (b1). As mentioned above, it is considered that the water/oil repellent function of the coating film obtained from the composition of the present invention is enhanced by the alkyl group having 6 or more carbon atoms derived from the organosilicon compound (A) or the trialkylsilyl group-containing molecular chain, and the metal element M, to which such an alkyl group or trialkylsilyl group-containing molecular chain is not bonded, functions as a spacer in the coating film.

[Chemical Formula 32]

$$M(R^{b10})_r(A^{b1})_{m-r} \quad (b1)$$

In the formula (b1), $R^{b10}$ represents a hydrocarbon chain-containing group having 5 or less carbon atoms, $A^{b1}$ each independently represents a hydrolyzable group, M represents Al, Fe, In, Ge, Hf, Si, Ti, Sn, Zr or Ta, m represents an integer of 1 to 5 according to a metal atom, and r is 0 or 1.

$R^{b10}$ is a group having 5 or less carbon atoms, which has a hydrocarbon chain in at least part of the constitution. The hydrocarbon chain-containing group of $R^{b10}$ is usually constituted only of a hydrocarbon group (hydrocarbon chain) and, if necessary, a part of methylene groups of this hydrocarbon chain may be replaced by an oxygen atom. Like $R^{a10}$, the methylene group adjacent to the metal atom M is not replaced by an oxygen atom, and two successive methylene groups are not simultaneously replaced by an oxygen atom.

The number of carbon atoms of the hydrocarbon chain moiety of $R^{b10}$ is preferably 4 or less. $R^{b10}$ is preferably a saturated or unsaturated aliphatic hydrocarbon group, more preferably a linear saturated aliphatic hydrocarbon group, and includes a methyl group, an ethyl group, a propyl group, a butyl group, a pentyl group and the like, and a methyl group, an ethyl group, a propyl group and a butyl group are particularly preferable. When a part of methylene groups of the hydrocarbon chain are replaced by an oxygen atom, the hydrocarbon chain-containing group is preferably a saturated aliphatic hydrocarbon group, and specific examples thereof include a group including a (poly)ethylene glycol unit.

r is 0 or 1, and preferably 0.

Examples of the hydrolyzable group of $A^{b1}$ include the hydrolyzable group exemplified for $A^{a1}$ of the above formula (a1), and a plurality of $A^{b1}$ may be the same or different, and preferably the same. The hydrolyzable group of $A^{b1}$ is preferably an alkoxy group having 1 to 6 carbon atoms, more preferably an alkoxy group having 1 to 4 carbon atoms, still more preferably a methoxy group or an ethoxy group, and particularly preferably a plurality of $A^{b1}$ are the same in these cases.

M is preferably Al, Si, Ti, Zr or Sn, more preferably Al, Si, Ti or Zr, and still more preferably Si.

The value of m is 3 when M is a trivalent metal such as Al, Fe or In, 4 when M is a tetravalent metal such as Ge, Hf, Si, Ti, Sn or Zr, and 5 when M is a pentavalent metal such as Ta.

Examples of the metal compound (B) include a compound in which only a hydrolyzable group is bonded to a metal atom (i.e., r=0); and a compound in which one hydrocarbon chain-containing group having 5 or less carbon atoms and two hydrolyzable groups are bonded to a metal atom (i.e., r=1).

Examples of the compound in which only a hydrolyzable group is bonded to a metal atom include tetraalkoxy silanes such as tetramethoxy silane, tetraethoxy silane, tetrapropoxy silane and tetrabutoxy silane; trialkoxy aluminums such as triethoxy aluminum, tripropoxy aluminum and tributoxy aluminum; trialkoxy irons such as triethoxy iron; trialkoxy indiums such as trimethoxy indium, triethoxy indium, tripropoxy indium and tributoxy indium; tetraalkoxy germaniums such as tetramethoxy germanium, tetraethoxy germanium, tetrapropoxy germanium and tetrabutoxy germanium; tetraalkoxy hafniums such as tetramethoxy hafnium, tetraethoxy hafnium, tetrapropoxy hafnium and tetrabutoxy hafnium; tetraalkoxy titaniums such as tetramethoxy titanium, tetraethoxy titanium, tetrapropoxy titanium and tetrabutoxy titanium; tetraalkoxy tins such as tetramethoxy tin, tetraethoxy tin, tetrapropoxy tin and tetrabutoxy tin; tetraalkoxy zirconiums such as tetramethoxy zirconium, tetraethoxy zirconium, tetrapropoxy zirconium and tetrabutoxy zirconium; and pentaalkoxy tantalums such as pentamethoxy tantalum, pentaethoxy tantalum, pentapropoxy tantalum and pentabutoxy tantalum.

Examples of the compound in which one hydrocarbon chain-containing group having 5 or less carbon atoms and two hydrolyzable groups are bonded to a metal atom include alkyltrialkoxy silanes such as methyltrimethoxy silane, ethyltrimethoxy silane, methyltriethoxy silane, ethyltriethoxy silane and methyltripropoxy silane; and alkenyltrialkoxy silanes such as vinyltrimethoxy silane and vinyltriethoxy silane.

The metal compound (B) is preferably a compound represented by the following formula (b2).

[Chemical Formula 33]

$$Si(OR^{b11})_4 \quad (b2)$$

In the formula (b2), $R^{b11}$ is an alkyl group having 1 to 6 carbon atoms. $R^{b11}$ is preferably an alkyl group having 1 to 4 carbon atoms, and more preferably a methyl group or an ethyl group.

A molar ratio (B/A) of the metal compound (B) to the organosilicon compound (A) (organosilicon compound (A1) or (A2)) is preferably 0.1 or more and 48 or less. B/A is more preferably 44 or less, still more preferably 40 or less, and yet more preferably 36 or less. B/A may be set at 1 or more, 5 or more, and 10 or more.

3. Carboxylic Acid Compound (C)

The composition of the present invention includes a carboxylic acid compound (C) together with the above-mentioned organosilicon compound (A) (organosilicon compound (A1) or (A2)) and metal compound (B). Inclusion of the carboxylic acid compound (C) inhibits the hydrolyzable group bonded to the silicon atom or metal atom from causing the hydrolysis/polycondensation reaction, thus making it possible to inhibit deterioration of the storage stability due to gelation of the composition.

The carboxylic acid compound means a compound having at least one carboxy group and may be either a monovalent carboxylic acid or a polyvalent carboxylic acid (carboxylic acid having two or more carboxy groups), and is preferably a polyvalent carboxylic acid. The polyvalent carboxylic acid is more preferably oxalic acid in which two carboxy groups are directly bonded, or a polyvalent carboxylic acid (particularly dicarboxylic acid, tricarboxylic acid or tetracarboxylic acid) in which a carboxy group is bonded to both ends of a divalent hydrocarbon group, and the number of carbon atoms of the main chain (longest linear chain) of the hydrocarbon group is 1 to 15 (the number of carbon atoms is more preferably 1 to 5, still more preferably 1 to 4, and particularly preferably 1 to 2). At this time, the divalent hydrocarbon group may be linear or branched, may be an aliphatic hydrocarbon group or an aromatic hydrocarbon group, or may be a saturated hydrocarbon group or an unsaturated hydrocarbon group, and a hydroxy group or a carboxy group may be bonded to the carbon atom other than both ends of the hydrocarbon group. Examples of such carboxylic acid include dicarboxylic acids such as oxalic acid, malonic acid, succinic acid, maleic acid, fumaric acid, glutaric acid, adipic acid, pimelic acid, tartaric acid, malic acid, phthalic acid, itaconic acid, muconic acid, 1,4-cyclohexanedicarboxylic acid, 1,4-naphthalenedicarboxylic acid, 2,6-naphthalenedicarboxylic acid, 2,7-naphthalenedicarboxylic acid and 4,4'-biphenyldicarboxylic acid; tricarboxylic acids such as citric acid, aconitic acid, trimellitic acid, trimesic acid and biphenyl-3,4',5-tricarboxylic acid; and tetracarboxylic acids such as butanetetracarboxylic acid.

The carboxylic acid compound (C) is preferably a polyvalent carboxylic acid, more preferably oxalic acid or dicarboxylic acid in which a carboxy group is bonded to both ends of a saturated or unsaturated linear hydrocarbon group having 1 to 3 (particularly 1 to 2) carbon atoms, or tricarboxylic acid. Examples of the polyvalent carboxylic acid include oxalic acid, malonic acid, succinic acid, maleic acid, glutaric acid and tricarballylic acid, and oxalic acid, malonic acid, succinic acid, maleic acid and tricarballylic acid are particularly preferable.

The carboxylic acid compound (C) may be a polymer having at least one carboxy group in the molecule. Examples of the polymer include a polymer including a structural unit having a carboxy group in the side chain, and the polymer may include a structural unit having a carboxy group in two or more side chains. Examples of the polymer having at least one carboxy group in the molecule include a (meth)acrylic polymer having a carboxy group, a polyester polymer having a carboxy group, a polyolefin polymer having a carboxy group and the like.

The carboxylic acid compound (C) preferably has a molecular weight of 1,000 or less, and more preferably 500 or less, and preferably 50 or more, and more preferably 80 or more.

The carboxylic acid compound (C) is preferably a compound represented by the following formula (c1):

[Chemical Formula 34]

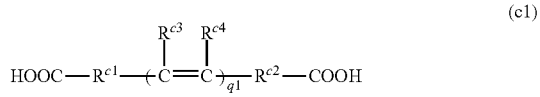

(c1)

wherein, in formula (c1), $R^{c1}$ and $R^{c2}$ each independently represent a single bond, a divalent aliphatic hydrocarbon group having 1 to 10 carbon atoms which may have a carboxy group, or a divalent aromatic hydrocarbon group having 6 to 10 carbon atoms which may have a carboxy group, $R^{c3}$ and $R^{c4}$ each independently represent an alkyl group having 1 to 10 carbon atoms which may have a carboxy group, or a hydrogen atom, and q1 represents 0 or 1.

The divalent aliphatic hydrocarbon group having 1 to 10 carbon atoms represented by $R^{c1}$ and $R^{c2}$ may be linear, branched or cyclic. Specific examples thereof include alkanediyl groups such as a methylene group, an ethylene group, a propylene group and a butylene group.

Examples of the divalent aromatic hydrocarbon group represented by $R^{c1}$ and $R^{c2}$ include a phenylene group and the like.

The divalent aliphatic hydrocarbon group or divalent aromatic hydrocarbon group represented by $R^{c1}$ and $R^{c2}$ may have a carboxy group.

The alkyl group having 1 to 10 carbon atoms represented by $R^{c3}$ and $R^{c4}$ may be linear, branched or cyclic. Specific examples thereof include a methyl group, an ethyl group, a propyl group, a butyl group and the like.

$R^{c1}$ is preferably a single bond or a divalent aliphatic hydrocarbon group having 1 to 10 carbon atoms which may have a carboxy group, and more preferably a single bond or a divalent linear aliphatic hydrocarbon group having 1 to 10 carbon atoms which may have a carboxy group.

$R^{c2}$ is preferably a single bond.
$R^{c3}$ is preferably a hydrogen atom.
$R^{c4}$ is preferably a hydrogen atom.

The compound represented by the above formula (c1) is more preferably a compound represented by the following formula (c2).

[Chemical Formula 35]

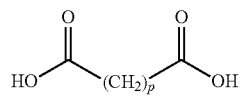

(c2)

In the formula (c2), p is an integer of 0 to 2.

In the composition of the present invention, it is preferable that the organosilicon compound (A) is an organosilicon compound (A1) represented by the above formula (a1-2) or an organosilicon compound (A2) represented by the above formula (a2-2), the metal compound (B) is a compound represented by the above formula (b2), and the carboxylic acid compound (C) is dicarboxylic acid in which a carboxy group is bonded to both ends of a saturated or unsaturated linear hydrocarbon group having 1 to 3 carbon atoms.

In the compositions of the present invention (first to third compositions), a ratio (C/(A+B)) of the carboxylic acid compound (C) to the total amount of the organosilicon compound (A) (organosilicon compound (A1) or (A2)) and the metal compound (B) is preferably 1 to 21% by mass. The mass ratio (C/(A+B) is more preferably 2% by mass or more, and still more preferably 4% by mass or more, and preferably 20% by mass or less, more preferably 18% by mass or less, and still more preferably 15% by mass or less.

The compositions of the present invention (first to third compositions) may include, in addition to the organosilicon compound (A), the metal compound (B) and the carboxylic acid compound (C), a solvent (D). Examples of the solvent (D) include hydrophilic organic solvents such as alcohol-based solvents, ether-based solvents, ketone-based solvents, ester-based solvents and amide-based solvents.

Examples of the alcohol-based solvents include methanol, ethanol, propanol, butanol, ethylene glycol, propylene glycol, diethylene glycol and the like; examples of the ether-based solvents include dimethoxyethane, tetrahydrofuran, dioxane and the like; examples of the ketone-based solvents include acetone, methyl ethyl ketone (2-butanone) and the like; examples of the ester-based solvents include ethyl acetate, butyl acetate and the like; and examples of the amide-based solvents include dimethylformamide and the like. Of these, alcohol-based solvents and ether-based solvents are preferable, and alcohol-based solvents are more preferable.

The first composition of the present invention includes a catalyst (E), and it is preferable that the catalyst (E) coexists in the second and third compositions of the present invention. The catalyst (E) can be selected from acid catalysts such as hydrochloric acid, base catalysts, organometallic catalysts and the like which are generally used in the sol-gel method. The catalyst (E) is preferably an acid catalyst, and more preferably a catalyst of an inorganic acid. The acid catalyst is preferably a catalyst having a pKa (acid dissociation constant) of 5 or less, more preferably an inorganic acid having a pKa of 5 or less (e.g., hydrochloric acid, nitric acid, sulfuric acid, phosphoric acid, etc.). The inorganic acid is preferably hydrochloric acid, nitric acid, sulfuric acid, phosphoric acid and the like. The ratio (E/(A+B)×100) of the catalyst (E) to the total amount of 100 molar parts of the organosilicon compound (A) and the metal compound (B) is usually 0.1 to 5 molar parts, and preferably 0.2 to 4 molar parts.

When the acid catalyst is included in the composition of the present invention, it is preferable that the composition includes a hydrolytic condensate in which the organosilicon compound (A) (i.e., organosilicon compound (A1) or (A2)) and the metal compound (B) are hydrolyzed with a water-containing acid catalyst, and the carboxylic acid compound (C), and this acid catalyst is a catalyst having a pKa of 5 or less.

It is preferable that the first or second composition of the present invention includes a hydrolytic condensate in which the above organosilicon compound represented by formula (a1) (A1) and metal compound (B) are hydrolyzed with a water-containing acid catalyst, and the carboxylic acid compound (C), and the acid catalyst is an inorganic acid.

It is more preferable that the third composition of the present invention includes a hydrolytic condensate in which the above organosilicon compound represented by formula (a2) (A2) and metal compound (B) are hydrolyzed with a water-containing acid catalyst, and the carboxylic acid compound (C), and the acid catalyst is an inorganic acid.

In order to prepare the compositions of the present invention including preferred aspects, for example, it is preferable that a water-containing acid catalyst (preferably an acid catalyst having a pKa of 5 or less) is added to the organosilicon compound (A) and the metal compound (B) (if necessary, after dissolving the solvent (D)) and, after mixing while stirring for about 30 minutes to 3 hours (at this time, a hydrolytic condensate obtained by hydrolyzing the organosilicon compound (A) and the metal compound (B) with the water-containing acid catalyst is included), a carboxylic acid compound is added, followed by mixing for about 10 to 30 hours. Thereafter, if necessary, the solvent (D) is further added, thus making it possible to adjust the solid component concentration of the organosilicon compound (A), the metal compound (B) and the carboxylic acid compound (C). When adding the carboxylic acid compound (C), the carboxylic acid compound may be dissolved in advance in the solvent (D) to prepare a carboxylic acid compound solution, and this solution may be added.

The solid component concentration of the organosilicon compound (A), the metal compound (B) and the carboxylic acid compound (C) in the compositions (first to third compositions) of the present invention is preferably 0.02% by mass or more and 20% by mass or less. The solid component concentration (A+B+C) is preferably 0.05% by mass or more, more preferably 0.5% by mass or more, still more preferably 5% by mass or less, and yet more preferably 3% by mass or less. The solid component concentration (A+C) of the organosilicon compound (A) and the carboxylic acid compound (C) in the compositions of the present invention is preferably 0.001% by mass or more, and more preferably 0.007% by mass or more, and preferably 0.7% by mass or less, and more preferably 0.5% by mass or less.

In the second composition of the present invention, as mentioned above, the solid component concentration of the organosilicon compound represented by formula (a1) (A) and the carboxylic acid compound (C) is 0.001% by mass or more and 3.5% by mass or less, and this requirement is also preferable in the first composition of the present invention. In either first or second composition, the concentration of the organosilicon compound (A) and the carboxylic acid compound (C) is more preferably 0.002% by mass or more, still more preferably 0.01% by mass or more, and more preferably 3.0% by mass or less, and still more preferably 2.5% by mass or less. In the first and second compositions, the concentration of the organosilicon compound (A) and the carboxylic acid compound (C) is preferably 0.007% by mass or more, and preferably 0.7% by mass or less, and more preferably 0.5% by mass or less.

In the compositions of the present invention (first and second compositions), the total concentration of the organosilicon compound represented by formula (a1) (A1), the metal compound (B) represented by formula (b1) and the carboxylic acid compound (C) is preferably 0.002% by mass or more, and preferably 30% by mass or less. The concentration of the organosilicon compound (A1), the metal compound (B) and the carboxylic acid compound (C) in the first and second compositions is more preferably 0.01% by mass or more, still more preferably 0.02% by mass or more, and yet more preferably 0.05% by mass or more, and more preferably 20% by mass or less, and still more preferably 10% by mass or less. The concentration of the organosilicon compound (A1), the metal compound (B) and the carboxylic acid compound (C) in the first and second compositions may be 0.5% by mass or more, 5% by mass or less, or 3% by mass or less.

In the third composition of the present invention, the solid component concentration of the organosilicon compound represented by formula (a2) (A2), the metal compound (B) and the carboxylic acid compound (C) is preferably 0.002% by mass or more, and preferably 30% by mass or less. The solid component concentration is more preferably 0.05% by mass or more, still more preferably 0.01% by mass or more, yet more preferably 0.02% by mass or more, and further preferably 0.05% by mass or more, and more preferably 20% by mass or less, still more preferably 10% by mass or less, and yet more preferably 3% by mass or less. In the third composition, the concentration of the organosilicon compound (A2), the metal compound (B) and the carboxylic acid compound (C) may be 0.5% by mass or more, 5% by mass or less or 3% by mass or less.

In the third composition of the present invention, the solid component concentration of the organosilicon compound represented by formula (a2) (A2) and the carboxylic acid compound (C) is preferably 0.001% by mass or more, and more preferably 3.5% by mass or less. The concentration of the organosilicon compound (A2) and the carboxylic acid compound (C) is more preferably 0.002% by mass or more, and still more preferably 0.01% by mass or more, and more preferably 3.0% by mass or less, and still more preferably 2.5% by mass or less. In the third composition, the concentration of the organosilicon compound (A2) and the carboxylic acid compound (C) is preferably 0.007% by mass or more, and preferably 0.7% by mass or less, and more preferably 0.5% by mass or less.

The compositions of the present invention (first to third compositions) may include various additives such as silanol condensation catalysts, antioxidants, rust inhibitors, ultraviolet absorbers, light stabilizers, antifungal agents, antibacterial agents, organism deposition preventing agent, deodorants, pigments, flame retardants and antistatic agents as long as the effects of the present invention are not impaired.

Examples of the method of bringing the compositions of the present invention (first to third compositions) into contact with a substrate include a method of coating the composition on a substrate, and specific examples thereof include a spin coating method, a dip coating method, a spray coating method, a roll coating method, a bar coating method, a hand coating method (a method of impregnating a solution with a cloth, etc., followed by application to a substrate), a solution coating method (a method of applying a solution by pouring the solution over a substrate as it is using a dropper, etc.), a spraying method (a method of applying to a substrate using a sprayer) and the like. From the viewpoint of workability, a hand coating method, a solution coating method, a spraying method and a spray coating method are particularly preferable. In a state where the composition of the present invention is in contact with a substrate, when the composition is left to stand in the air at a normal temperature (e.g., 0.5 hour to 48 hours, and preferably 10 hours to 48 hours) or heated for about 10 to 30 hours (e.g., 300° C. or lower), moisture in the air is taken in the composition leading to acceleration of hydrolysis/polycondensation of the hydrolysable, thus enabling formation of a coating film on the substrate. It is also preferable to further dry the coating film thus obtained. The thickness of the coating film can be set at, for example, about 1 to 50 nm.

There is no particular limitation on the substrate with which the compositions (first to third compositions) of the present invention are to be brought into contact, and the substrate may have a flat or curved shape, or a three-dimensional structure in which multiple faces are combined. There is also no particular limitation on the material of the base material, and the base material may be composed of either an organic material or an inorganic material. Examples of the organic material include thermoplastic resins such as an acrylic resin, a polycarbonate resin, a polyester resin, a styrene resin, an acrylic-styrene copolymer resin, a cellulose resin and a polyolefin resin; and thermosetting resins such as a phenol resin, a urea resin, a melamine resin, an epoxy resin, an unsaturated polyester, a silicone resin and an urethane resin. Examples of the inorganic material include ceramics; glass; metals such as iron, silicon, copper, zinc and aluminum; and alloys containing the above metals.

The substrate may be subjected to an easy adhesion treatment in advance. Examples of the easy adhesion treatment include hydrophilic treatments such as a corona treatment, a plasma treatment and an ultraviolet treatment. A primer treatment with a resin, a silane coupling agent, tetraalkoxysilane or the like may also be used. The substrate may be subjected to a primer treatment with a resin, a silane coupling agent, tetraalkoxysilane or the like, or a glass coating film made of polysilazane may be formed in advance on the substrate.

EXAMPLES

The present disclosure will be more specifically described by way of Examples. It is to be understood that the present disclosure is not limited to the following Examples, and various design variations made in accordance with the purports mentioned hereinbefore and hereinafter are also included in the technical scope of the present disclosure.

Example 1

(Preparation of Coating Solution)

$1.84 \times 10^{-4}$ mol of n-decyltrimethoxysilane and $4.791 \times 10^{-3}$ mol of tetraethyl orthosilicate (tetraethoxysilane) were dissolved in 1.2 ml of isopropyl alcohol, followed by stirring at room temperature for 20 minutes. To the solution thus obtained, 1.4 ml of an aqueous 0.01 M hydrochloric acid solution was added dropwise and, after stirring for 1 hour, 1.3 ml of a malonic acid solution diluted with isopropyl alcohol to a mass ratio of 10 times was added dropwise. After stirring for 24 hours from the start of preparation, a sample solution 1 was obtained. The sample solution 1 was diluted with isopropyl alcohol to a volume ratio of 30 times to prepare a coating solution 1. Each proportion (molar parts, parts by mass) of the respective compounds in the coating solution is as mentioned in Table 1 (the same as in the other Examples and Comparative Examples).

(Preparation of Coating Film)

An alkali-cleaned glass substrate 5×5 cm² (EAGLE XG, manufactured by Corning Incorporated) was placed at an elevation angle of 80°. A coating solution 1 (0.5 ml) was poured over the entire surface of the glass substrate using a dropper, and then cured by being left to stand at a normal temperature for 24 hours to form a coating film on the glass substrate. Thereafter, the coating film was evaluated by the measurement method mentioned later. After the coating solution 1 was stored at a normal temperature for 30 days, a coating film was formed on the glass substrate in the same manner as mentioned above, and the coating film was evaluated by the measurement method mentioned later.

Example 2

$1.84 \times 10^{-4}$ mol of n-decyltrimethoxysilane and $4.791 \times 10^{-3}$ mol of tetraethyl orthosilicate were dissolved in 1.8 ml of isopropyl alcohol, followed by stirring at room temperature for 20 minutes. To the solution thus obtained, 1.4 ml of an aqueous 0.01 M hydrochloric acid solution was added dropwise and, after stirring for 1 hour, 0.67 ml of an oxalic acid solution diluted with isopropyl alcohol to a mass ratio of 10 times was added dropwise. After stirring for 24 hours from the start of preparation, a sample solution 2 was obtained. The sample solution 2 was diluted with isopropyl alcohol to a volume ratio of 30 times to prepare a coating solution 2.

In the same manner as in Example 1, except that the coating solution 2 was used, a coating film was respectively formed immediately after the preparation of the coating solution 2 and after storage at a normal temperature for 30 days, and the coating film was evaluated by the measurement method mentioned later.

Example 3

$1.84 \times 10^{-4}$ mol of n-decyltrimethoxysilane and $4.791 \times 10^{-3}$ mol of tetraethyl orthosilicate were dissolved in 1.8 ml of isopropyl alcohol, followed by stirring at room temperature for 20 minutes. To the solution thus obtained, 1.4 ml of an aqueous 0.01 M hydrochloric acid solution was added dropwise and, after stirring for 1 hour, 0.67 ml of a maleic acid solution diluted with isopropyl alcohol to a mass ratio of 10 times was added dropwise. After stirring for 24 hours from the start of preparation, a sample solution 3 was obtained. The sample solution 3 was diluted with isopropyl alcohol to a volume ratio of 30 times to prepare a coating solution 3.

In the same manner as in Example 1, except that the coating solution 3 was used, a coating film was respectively formed immediately after the preparation of the coating solution 3 and after storage at a normal temperature for 30 days, and the coating film was evaluated by the measurement method mentioned later.

Example 4

$1.84 \times 10^{-4}$ mol of n-decyltrimethoxysilane and $4.791 \times 10^{-3}$ mol of tetraethyl orthosilicate were dissolved in 1.8 ml of isopropyl alcohol, followed by stirring at room temperature for 20 minutes. To the solution thus obtained, 1.4 ml of an aqueous 0.01 M hydrochloric acid solution was added dropwise and, after stirring for 1 hour, 0.67 ml of a succinic acid solution diluted with isopropyl alcohol to a mass ratio of 20 times was added dropwise. After stirring for 24 hours from the start of preparation, a sample solution 4 was obtained. The sample solution 4 was diluted with isopropyl alcohol to a volume ratio of 30 times to prepare a coating solution 4.

In the same manner as in Example 1, except that the coating solution 4 was used, a coating film was respectively formed immediately after the preparation of the coating solution 4 and after storage at a normal temperature for 30 days, and the coating film was evaluated by the measurement method mentioned later.

Example 5

$8.0 \times 10-5$ mol of a compound 1 in which n in the above formula (a2-2) is 24 and $1.591 \times 10\text{-s}$ mol of tetraethyl orthosilicate were dissolved in 5.3 ml of 2-butanone, followed by stirring at room temperature for 20 minutes. To the solution thus obtained, 3.1 ml of an aqueous 0.01 M hydrochloric acid solution was added dropwise and, after stirring for 1 hour, 0.26 ml of a malonic acid solution diluted with 2-butanone to a mass ratio of 10 times was added dropwise. After stirring for 24 hours from the start of preparation, a sample solution 5 was obtained. The sample solution 5 was diluted with 2-butanone to a volume ratio of 20 times to prepare a coating solution 5.

The coating solution 5 was applied on the same glass substrate as in Example 1 by a spin coating method and left to stand at a normal temperature for 24 hours, and then cured at a predetermined temperature to obtain a coating film. The coating film was formed under the conditions of a rotational speed of 3,000 rpm for 20 seconds using a spin coater manufactured by MIKASA CO., LTD. In the same manner as in Example 1, except for the above, a coating film was respectively formed immediately after the preparation of the coating solution 5 and after storage at a normal temperature for 30 days, and the coating film was evaluated by the measurement method mentioned later.

Example 6

$1.84 \times 10^{-4}$ mol of n-decyltrimethoxysilane and $4.791 \times 10^{-3}$ mol of tetraethyl orthosilicate were dissolved in 2.5 ml of isopropyl alcohol, followed by stirring at room temperature for 20 minutes. To the solution thus obtained, 1.4 ml of an aqueous malonic acid solution diluted with water so as to adjust to the concentration of 0.7 M was added dropwise. After stirring for 24 hours from the start of preparation, a sample solution 6 was obtained. The sample solution 6 was diluted with isopropyl alcohol to a volume ratio of 30 times to prepare a coating solution 6.

In the same manner as in Example 1, except that the coating solution 6 was used, a coating film was respectively formed immediately after the preparation of the coating solution 6 and after storage at a normal temperature for 30 days, and the coating film was evaluated by the measurement method mentioned later.

Comparative Example 1

$1.84 \times 10^{-4}$ mol of n-decyltrimethoxysilane and $4.791 \times 10^{-3}$ mol of tetraethyl orthosilicate were dissolved in 2.5 ml of isopropyl alcohol, followed by stirring at room temperature for 20 minutes. To the solution thus obtained, 1.4 ml of an aqueous 0.01 M hydrochloric acid solution was added dropwise. After stirring for 24 hours from the start of preparation, a comparative sample solution 1 was obtained. The comparative sample solution 1 was diluted with isopropyl alcohol to a volume ratio of 30 times to prepare a comparative coating solution 1.

In the same manner as in Example 1, except that the comparative coating solution 1 was used, a coating film was respectively formed immediately after the preparation of the comparative coating solution 1 and after storage at a normal temperature for 30 days, and the coating film was evaluated by the measurement method mentioned later.

Comparative Example 2

$1.84 \times 10^{-4}$ mol of n-decyltrimethoxysilane and $4.791 \times 10^{-3}$ mol of tetraethyl orthosilicate were dissolved in 1.8 ml of isopropyl alcohol, followed by stirring at room temperature for 20 minutes. To the solution thus obtained, 1.4 ml of an aqueous 0.01 M hydrochloric acid solution was added dropwise and, after stirring for 1 hour, 0.67 ml of an acetylacetone solution diluted with isopropyl alcohol to a mass ratio of 10 times was added dropwise. After stirring for 24 hours from the start of preparation, a comparative sample solution 2 was obtained. The comparative sample solution 2 was diluted with isopropyl alcohol to a volume ratio of 30 times to prepare a comparative coating solution 2.

In the same manner as in Example 1, except that the comparative coating solution 2 was used, a coating film was respectively formed immediately after the preparation of the comparative coating solution 2 and after storage at a normal temperature for 30 days, and the coating film was evaluated by the measurement method mentioned later.

Comparative Example 3

$1.84 \times 10^{-4}$ mol of n-decyltrimethoxysilane and $4.791 \times 10^{-3}$ mol of tetraethyl orthosilicate were dissolved in 1.8 ml of isopropyl alcohol, followed by stirring at room temperature for 20 minutes. To the solution thus obtained, 1.4 ml of an aqueous 0.01 M hydrochloric acid solution was added dropwise and, after stirring for 1 hour, 0.67 ml of a diethyl malonate solution diluted with isopropyl alcohol to a mass ratio of 10 times was added dropwise. After stirring for 24 hours from the start of preparation, a comparative sample solution 3 was obtained. The comparative sample solution 3 was diluted with isopropyl alcohol to a volume ratio of 30 times to prepare a comparative coating solution 3.

In the same manner as in Example 1, except that the comparative coating solution 3 was used, a coating film was respectively formed immediately after the preparation of the comparative coating solution 3 and after storage at a normal temperature for 30 days, and the coating film was evaluated by the measurement method mentioned later.

Example 7

$9.42 \times 10^{-4}$ mol of n-decyltrimethoxysilane and $3.77 \times 10^{-3}$ mol of tetraethyl orthosilicate (tetraethoxysilane) were dissolved in 2.98 ml of isopropyl alcohol, followed by stirring at room temperature for 20 minutes. To the solution thus obtained, 0.64 ml of an aqueous 0.01 M hydrochloric acid solution was added dropwise and, after stirring for 1 hour, 0.26 ml of a malonic acid solution diluted with isopropyl alcohol to a mass ratio of 10 times was added dropwise. After stirring for 24 hours from the start of preparation, a sample solution 7 was obtained. The sample solution 7 was diluted with isopropyl alcohol to a volume ratio of 3 times to prepare a coating solution 7.

In the same manner as in Example 1, except that, when a coating film is formed on a glass substrate, 0.2 ml of the coating solution 7 was spin-coated under the conditions of a rotational speed of 3,000 rpm for 20 seconds using a spin coater manufactured by MIKASA CO., LTD., a coating film was respectively formed immediately after the preparation of the coating solution 7 and after storage at a normal temperature for 30 days, and the coating film was evaluated by the measurement method mentioned later.

Example 8

$9.42 \times 10^{-4}$ mol of n-decyltrimethoxysilane and $3.77 \times 10^{-3}$ mol of tetraethyl orthosilicate (tetraethoxysilane) were dissolved in 1.3 ml of isopropyl alcohol, followed by stirring at room temperature for 20 minutes. To the solution thus obtained, 1.3 ml of an aqueous 0.01 M hydrochloric acid solution was added dropwise and, after stirring for 1 hour, 1.3 ml of a malonic acid solution diluted with isopropyl alcohol to a mass ratio of 10 times was added dropwise. After stirring for 24 hours from the start of preparation, a sample solution 8 was obtained. The sample solution 8 was diluted with isopropyl alcohol to a volume ratio of 500 times to prepare a coating solution 8.

In the same manner as in Example 1, except that, when a coating film is formed on a glass substrate, a coating film of the coating solution 8 was formed by spraying, a coating film was respectively formed immediately after the preparation of the coating solution 8 and after storage at a normal temperature for 30 days, and the coating film was evaluated by the measurement method mentioned later.

Example 9

$9.42 \times 10^{-4}$ mol of n-decyltrimethoxysilane and $3.77 \times 10^{-3}$ mol of tetraethyl orthosilicate (tetraethoxysilane) were dissolved in 2.0 ml of isopropyl alcohol, followed by stirring at room temperature for 20 minutes. To the solution thus obtained, 1.3 ml of an aqueous 0.01 M hydrochloric acid solution was added dropwise and, after stirring for 1 hour, 0.67 ml of a tricarballylic acid solution diluted with isopropyl alcohol to a mass ratio of 10 times was added dropwise. After stirring for 24 hours from the start of preparation, a sample solution 9 was obtained. The sample solution 7 was diluted with isopropyl alcohol to a volume ratio of 500 times to prepare a coating solution 9.

In the same manner as in Example 8, except that the coating solution 9 was used, a coating film was respectively formed immediately after the preparation of the coating solution 9 and after storage at a normal temperature for 30 days, and the coating film was evaluated by the measurement method mentioned later.

Comparative Example 4

$2.72 \times 10^{-4}$ mol of n-decyltrimethoxysilane and $7.09 \times 10^{-3}$ mol of tetraethyl orthosilicate were dissolved in 1.3 ml of isopropyl alcohol, followed by stirring at room temperature for 20 minutes. To the solution thus obtained, 1.3 ml of an aqueous malonic acid solution diluted with water so as to adjust to the concentration of 0.7 M was added dropwise. After stirring for 24 hours from the start of preparation, a comparative sample solution 4 was obtained.

In the same manner as in Example 7, except that the comparative coating solution 4 was used, a coating film was respectively formed immediately after the preparation of the comparative coating solution 4 and after storage at a normal temperature for 30 days, and the coating film was evaluated by the measurement method mentioned later.

With respect to the coating films obtained in the above Examples and Comparative Examples, the sliding speed was measured in the following manner. Using a contact angle meter (DM700, manufactured by Kyowa Interface Science Co., Ltd.), 50 µL of water droplets were dropped on a substrate tilted to 20°, and the time for the droplets to slide 1.5 cm from the initial dropping position was measured to calculate sliding speed of the coating film surface.

The evaluation results of the coating films produced in the Examples and Comparative Examples are shown in Tables 5 and 6 together with the components of the composition for formation of a coating film. "Parts by mass" of each component in the tables indicate the mass ratio of each component based on all components. Parts by mass of Example 6 and Comparative Example 4 are 100 parts by mass including water used for dilution.

TABLE 5

| Components | | | | | Example 1 | Example 2 | Example 3 | Example 4 | Example 5 |
|---|---|---|---|---|---|---|---|---|---|
| Components | Organo-silicon compound (A) | Compound (a1) | n-Decyltrimethoxysilane | Molar part | 0.000184 | 0.000184 | 0.000184 | 0.000184 | |
| | | | | Parts by mass | 0.041 | 0.041 | 0.041 | 0.041 | |
| | | Compound (a2) | Compound 1 | Molar part | | | | | 0.000080 |
| | | | | Parts by mass | | | | | 0.120 |

TABLE 5-continued

|  |  |  |  |  |  |  |  |  |
|---|---|---|---|---|---|---|---|---|
|  | Metal compound (B) | Tetraethoxysilane |  | Molar part<br>Parts by mass | 0.004791<br>0.849 | 0.004791<br>0.849 | 0.004791<br>0.849 | 0.004791<br>0.849 | 0.001591<br>0.165 |
|  | Carboxylic acid compound (C) | Malonic acid |  | Molar part<br>Parts by mass | 0.001000<br>0.089 |  |  |  | 0.000200<br>0.014 |
|  |  | Oxalic acid |  | Molar part<br>Parts by mass |  | 0.000581<br>0.044 |  |  |  |
|  |  | Maleic acid |  | Molar part<br>Parts by mass |  |  | 0.000451<br>0.044 |  |  |
|  |  | Succinic acid |  | Molar part<br>Parts by mass |  |  |  | 0.00022<br>0.022 |  |
|  |  | Tricarballylic acid |  | Molar part<br>Parts by mass |  |  |  |  |  |
|  | Solvent (D) | Isopropyl alcohol<br>2-Butanone |  | Parts by mass<br>Parts by mass | 97.843 | 97.888 | 97.888 | 97.910 | 97.625 |
|  | Catalyst (E) | 0.01M Hydrochloric acid |  | Parts by mass | 1.178 | 1.178 | 1.178 | 1.178 | 2.076 |
|  | (B)/(A)<br>(C)/[(A) + (B)]<br>(A) + (C)<br>(A) + (B) + (C) |  |  | Molar ratio<br>Molar ratio (%)<br>Mass ratio (%)<br>% by mass<br>% by mass | 26<br>20<br>10<br>0.13<br>0.979 | 26<br>12<br>5<br>0.085<br>0.934 | 26<br>9<br>5<br>0.085<br>0.934 | 26<br>4<br>2.5<br>0.063<br>0.912 | 20<br>12<br>5<br>0.134<br>0.299 |
| Physical properties | Sliding speed | 1 Day<br>30 Days<br>Reduction rate after lapse of 30 days |  | (nm/sec)<br>(nm/sec)<br>(%) | 8.98<br>67.9<br>24.4 | 82.5<br>71.3<br>13.6 | 96.6<br>73.7<br>23.7 | 100.5<br>50.2<br>50.0 | 48.4<br>53.7<br>−11.0 |

|  |  |  |  |  |  | Example 6 | Example 7 | Example 8 | Example 9 |
|---|---|---|---|---|---|---|---|---|---|
| Components | Organosilicon compound (A) | Compound (a1) | n-Decyltrimethoxysilane |  | Molar part<br>Parts by mass | 0.000184<br>0.041 | 0.000942<br>2.058 | 0.000942<br>0.0127 | 0.000942<br>0.0127 |
|  |  | Compound (a2) | Compound 1 |  | Molar part<br>Parts by mass |  |  |  |  |
|  | Metal compound (B) | Tetraethoxysilane |  |  | Molar part<br>Parts by mass | 0.004791<br>0.847 | 0.00377<br>6.529 | 0.00377<br>0.0402 | 0.00377<br>0.0402 |
|  | Carboxylic acid compound (C) | Malonic acid |  |  | Molar part<br>Parts by mass | 0.001<br>0.179 | 0.000198<br>0.172 | 0.000991<br>0.0053 |  |
|  |  | Oxalic acid |  |  | Molar part<br>Parts by mass |  |  |  |  |
|  |  | Maleic acid |  |  | Molar part<br>Parts by mass |  |  |  |  |
|  |  | Succinic acid |  |  | Molar part<br>Parts by mass |  |  |  |  |
|  |  | Tricarballylic acid |  |  | Molar part<br>Parts by mass |  |  |  | 0.00029<br>0.0026 |
|  | Solvent (D) | Isopropyl alcohol<br>2-Butanone |  |  | Parts by mass<br>Parts by mass | 97.757 | 85.882 | 99.877 | 99.88 |
|  | Catalyst (E) | 0.01M Hydrochloric acid |  |  | Parts by mass |  | 5.359 | 0.065 | 0.065 |
|  | (B)/(A)<br>(C)/[(A) + (B)]<br>(A) + (C)<br>(A) + (B) + (C) |  |  |  | Molar ratio<br>Molar ratio (%)<br>Mass ratio (%)<br>% by mass<br>% by mass | 26<br>40<br>20<br>0.220<br>1.067 | 4<br>4<br>2<br>2.230<br>8.759 | 4<br>21<br>10<br>0.018<br>0.058 | 4<br>6<br>5<br>0.015<br>0.056 |
| Physical properties | Sliding speed | 1 Day<br>30 Days<br>Reduction rate after lapse of 30 days |  |  | (nm/sec)<br>(nm/sec)<br>(%) | 87.7<br>72.3<br>17.6 | 96.3<br>77.7<br>19.3 | 91.2<br>89.4<br>2.0 | 85.8<br>88.1<br>−2.7 |

TABLE 6

|  |  |  |  |  |  | Comparative Example 1 | Comparative Example 2 | Comparative Example 3 | Comparative Example 4 |
|---|---|---|---|---|---|---|---|---|---|
| Components | Organosilicon compound (A) | Compound (a1) | n-Decyltrimethoxysilane |  | Molar part | 0.000184 | 0.000184 | 0.000184 | 0.000272 |
|  |  | Compound (a2) | Compound 1 |  | Parts by mass<br>Molar part<br>Parts by mass | 0.041 | 0.041 | 0.041 | 1.456 |

TABLE 6-continued

| | | | | Comparative Example 1 | Comparative Example 2 | Comparative Example 3 | Comparative Example 4 |
|---|---|---|---|---|---|---|---|
| | Metal compound (B) | Tetraethoxysilane | Molar part | 0.004791 | 0.004791 | 0.004791 | 0.007091 |
| | | | Parts by mass | 0.0849 | 0.0849 | 0.0849 | 30.066 |
| | Compound (F) | Acetylacetone | Molar part | | 0.000523 | | |
| | | | Parts by mass | | 0.044 | | |
| | | Diethyl malonate | Molar part | | | 0.000327 | |
| | | | Parts by mass | | | 0.044 | |
| | Carboxylic acid compound (C) | Malonic acid | Molar part | | | | 0.002876 |
| | | | Parts by mass | | | | 6.093 |
| | Solvent (D) | Isopropyl alcohol | Parts by mass | 97.932 | 97.888 | 97.888 | 42.471 |
| | Catalyst (E) | 0.01M Hydrochloric acid | Parts by mass | 1.178 | 1.178 | 1.178 | |
| | (B)/(A) | | Molar ratio | 26 | 26 | 26 | 26 |
| | (F)/[(A) + (B)] | | Molar ratio (%) | 0 | 11 | 7 | |
| | | | Mass ratio (%) | 0 | 5 | 5 | |
| | (C)/[(A) + (B)] | | Molar ratio (%) | | | | 39 |
| | | | Mass ratio (%) | | | | 19 |
| | (A) + (C) | | % by mass | | | | 7.549 |
| Physical properties | Sliding speed | | 1 Day (nm/sec) | 84.8 | 97.1 | 80.8 | 103.47 |
| | | | 30 Days (nm/sec) | 35.1 | 11.7 | 15.4 | 0 |
| | | | Reduction rate after lapse of 30 days (%) | 58.6 | 88.0 | 80.9 | 100.0 |

Examples 1 to 6 which include the carboxylic acid compound (C) together with the organosilicon compound (A) and the metal compound (B) exhibit satisfactory sliding speed of 40 mm/sec or more even in the coating film formed after storage of the coating solution for 30 days, and exhibit satisfactory storage stability since the reduction rate of the sliding speed after 30 days is reduced to 50% or less. Meanwhile, in Comparative Examples 1 to 3 which do not include the carboxylic acid compound (C) (acetylacetone and diethyl malonate in Comparative Examples 2 and 3 are compounds which have a carbonyl group but have no carboxy group), the sliding speed of the coating film formed after storage of the coating solution for 30 days is less than 40 mm/sec, and the reduction rate of the sliding speed after 30 days exceeds 50%.

A contact angle of the coating film surface was measured by a droplet method (analysis method: θ/2 method, water drop amount: 3.0 µL) using a contact angle meter (DM700, manufactured by Kyowa Interface Science Co., Ltd.). As a result, the contact angles of the coating film formed immediately after the preparation of the coating solution are 109.5° in Example 1, 106.3° in Example 2, 107.2° in Example 3, 107.3° in Example 4, 99.6° in Example 5, 104.5° in Example 6, 109.2° in Example 7, 105.8° in Example 8, and 107.4° in Example 9, all of which are 95° or more (preferably 100° or more), which exhibited satisfactory water repellency. Furthermore, the contact angles of the coating film formed after storage of the coating solution at a normal temperature for 30 days with respect to the respective Examples are 101.8° in Example 1, 97.7° in Example 2, 96.3° in Example 3, 92.9° in Example 4, 101.7° in Example 5, 98.8° in Example 6, 104.9° in Example 7, 103.7° in Example 8, and 106.1° in Example 9, which realize the contact angle of 90° or more (preferably 95° or more) even after 30 days, which clearly exhibited satisfactory storage stability in view of the contact angle.

The contact angles of the coating film formed immediately after preparation of the coating solution and the coating film formed after storage of the coating solution for 30 days with respect to the respective Comparative Examples are 105.5° (immediately after preparation) and 94.1° (after storage for 30 days) in Comparative Example 1, 105.6° (immediately after preparation) and 89.6° (after storage for 30 days) in Comparative Example 2, 106.4° (immediately after preparation) and 89.3° (after storage for 30 days) in Comparative Example 3, and 107.7° (immediately after preparation) and 97.2° (after storage for 30 days) in Comparative Example 4.

With respect to the coating films formed immediately after preparation exhibited the sliding speed exceeding 80 mm/sec, the abrasion resistance was evaluated in the following manner. A steel wool tester (manufactured by DAIEI KAGAKU SEIKI MFG. Co., Ltd.) equipped with an HB pencil with an eraser (Mitsubishi Pencil Co., Ltd.) was used. In a state where an eraser is in contact with the coating film, an abrasion test was performed at a speed of 40 r/min by applying a load of 500 g and the test was repeated until peeling or scratch was visually conformed, or the contact angle of water decreased by 15° or more as compared with the contact angle before the test. As a result, the number of repetitions was 250 times in Example 1, 200 times in Example 2, 250 times in Example 3, 250 times in Example 4, 150 times in Example 6, 250 times in Example 7, 200 times in Example 8, and 300 times in Example 9.

With respect to Comparative Examples, the number of repetitions was 200 times in Comparative Example 1, 200 times in Comparative Example 2, 200 times in Comparative Example 3, and less than 10 times in Comparative Example 4.

The composition of the present invention is excellent in storage stability, and the coating film formed from the composition of the present invention has satisfactory water repellency and sliding properties. Therefore, the coating film is useful as a base material in display devices such as touch panel displays, optical elements, semiconductor elements, building materials, automobile parts, nanoimprint technique and the like. Further, the coating film formed from the composition of the present invention is suitably used as articles such as bodies, window glasses (windshield, side glass, rear glass), mirrors, and bumpers in transportation apparatuses such as trains, automobiles, ships, and aircrafts. It can also be used for outdoor applications such as building exterior walls, tents, photovoltaic power generation modules, sound insulation boards, and concrete. It can also be used for fishing nets, insect repository, aquarium and the like. Furthermore, it can be used for various indoor facilities such as kitchen, bathroom, washbasin, mirror, articles of various members around the toilet, china ceramics such as chandeliers and tiles, artificial marble, air conditioner and the like. It can also be used as an antifouling treatment for jigs, inner walls, piping and the like in factories. It is also suitable for goggles, eyeglasses, helmets, slot machine (Pachinko), fibers, umbrella, play equipment, soccer balls and the like. Furthermore, it can be used as an anti-adhesion agent for various packaging materials, such as food packaging material, cosmetic wrapping material, and pot interior.

What is claimed is:

1. A composition comprising:
an organosilicon compound (A1) represented by the following formula (a1),
a metal compound (B) represented by the following formula (b1),
a polyvalent carboxylic acid compound (C), and
an acid catalyst,
wherein the total concentration of the organosilicon compound (A1) and the polyvalent carboxylic acid compound (C) is 0.001% by mass or more and 3.5% by mass or less:

[Chemical Formula 1]

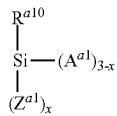  (a1)

wherein, in the formula (a1), $R^{a10}$ represents an alkyl group having 6 to 20 carbon atoms in which a part of methylene groups may be replaced by an oxygen atom and one or more hydrogen atoms may be replaced by a fluorine atom,
a plurality of $A^{a1}$ each independently represent a hydrolyzable group,
$Z^{a1}$ represents a hydrocarbon chain-containing group,
x is 0 or 1,
$Z^{a1}$ and $R^{a10}$ may be the same or different, and
$R^{a10}$ and $Z^{a1}$ may be the same or different between a plurality of formula (a1), and

[Chemical Formula 2]

$M(R^{b10})_r(A^{b1})_{m-r}$  (b1)

wherein, in the formula (b1),
$R^{b10}$ represents a hydrocarbon chain-containing group having 5 or less carbon atoms,
$A^{b1}$ each independently represent a hydrolyzable group,
M represents Al, Fe, In, Ge, Hf, Si, Ti, Sn, Zr or Ta,
m represents an integer of 1 to 5 according to a metal atom, and
r is 0 or 1.

2. The composition according to claim 1, wherein the total concentration of the organosilicon compound (A1) represented by formula (a1), the metal compound (B) represented by formula (b1) and the polyvalent carboxylic acid compound (C) is 0.02% by mass or more and 30% by mass or less.

3. A composition comprising:
an organosilicon compound (A1) represented by the following formula (a1),
a metal compound (B) represented by the following formula (b1), and a polyvalent carboxylic acid compound (C), wherein
the total concentration of the organosilicon compound (A1) and the polyvalent carboxylic acid compound (C) is 0.001% by mass or more and 3.5% by mass or less:

[Chemical Formula 3]

  (a1)

wherein, in the formula (a1), $R^{a10}$ represents an alkyl group having 6 to 20 carbon atoms in which apart of methylene groups may be replaced by an oxygen atom and one or more hydrogen atoms may be replaced by a fluorine atom,
a plurality of $A^{a1}$ each independently represent a hydrolyzable group,
$Z^{a1}$ represents a hydrocarbon chain-containing group,
x is 0 or 1,
$Z^{a1}$ and $R^{a10}$ may be the same or different, and
$R^{a10}$ and $Z^{a1}$ may be the same or different between a plurality of formula (a1), and

[Chemical Formula 4]

$M(R^{b10})_r(A^{b1})_{m-r}$  (b1)

wherein, in the formula (b1),
$R^{b10}$ represents a hydrocarbon chain-containing group having 5 or less carbon atoms,
$A^{b1}$ each independently represent a hydrolyzable group,
M represents Al, Fe, In, Ge, Hf, Si, Ti, Sn, Zr or Ta,
m represents an integer of 1 to 5 according to a metal atom, and
r is 0 or 1.

4. The composition according to claim 3, wherein a molar ratio (B/A1) of the metal compound (B) to the organosilicon compound (A1) is 0.1 or more and 48 or less.

5. The composition according to claim 3, wherein the organosilicon compound (A1) is represented by the following formula (a1-2):

[Chemical Formula 5]

$R^{a11}$—Si$(A^{a1})_3$  (a1-2)

wherein, in the formula (a1-2),
$R^{a11}$ is an alkyl group having 6 to 20 carbon atoms in which a hydrogen atom may be substituted with a fluorine atom, and
a plurality of $A^{a1}$ each independently represent a hydrolyzable group.

6. The composition according to claim 3, wherein the amount of the polyvalent carboxylic acid compound (C) is 1 to 21 parts by mass based on 100 parts by mass of the total amount of the organosilicon compound (A1) or the organosilicon compound (A2) and the metal compound (B).

7. The composition according to claim 3, wherein the metal compound (B) is represented by the following formula (b2):

[Chemical Formula 9]

Si(OR$^{b11}$)$_4$  (b2)

wherein, in the formula (b2), $R^{b11}$ is an alkyl group having 1 to 6 carbon atoms.

8. The composition according to claim 3, wherein the polyvalent carboxylic acid compound (C) is represented by the following formula (c1):

[Chemical Formula 10]

(c1)
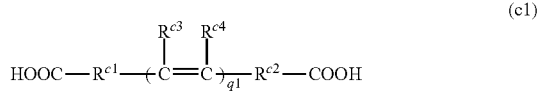

wherein, in the formula (c1), $R^{c1}$ and $R^{c2}$ each independently represent a single bond, a divalent aliphatic hydrocarbon group having 1 to 10 carbon atoms which may have a carboxy group, or a divalent aromatic hydrocarbon group having 6 to 10 carbon atoms which may have a carboxy group, $R^{c3}$ and $R^{c4}$ each independently represent an alkyl group having 1 to 10 carbon atoms which may have a carboxy group, or a hydrogen atom, and q1 represents 0 or 1.

9. The composition according to claim 3, wherein the polyvalent carboxylic acid compound (C) is represented by the following formula (c2):

[Chemical Formula 11]

(c2)

wherein, in the formula (c2), p represents an integer of 0 to 2.

10. The composition according to claim 3, wherein the total concentration of the organosilicon compound (A1) represented by formula (a1), the metal compound (B) represented by formula (b1) and the polyvalent carboxylic acid compound (C) is 0.02% by mass or more and 30% by mass or less.

* * * * *